US012512953B2

(12) United States Patent
Wang et al.

(10) Patent No.: US 12,512,953 B2
(45) Date of Patent: Dec. 30, 2025

(54) METHODS AND APPARATUSES FOR FREQUENCY HOPPING OF SOUNDING REFERENCE SIGNALS IN PARTIAL BANDWIDTHS

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Alexandros Manolakos, Escondido, CA (US); Yu Zhang, San Diego, CA (US); Pinar Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/002,845

(22) PCT Filed: Sep. 4, 2020

(86) PCT No.: PCT/CN2020/113507
§ 371 (c)(1),
(2) Date: Dec. 21, 2022

(87) PCT Pub. No.: WO2022/047735
PCT Pub. Date: Mar. 10, 2022

(65) Prior Publication Data
US 2023/0246792 A1    Aug. 3, 2023

(51) Int. Cl.
*H04L 5/00* (2006.01)
(52) U.S. Cl.
CPC .......... *H04L 5/0094* (2013.01); *H04L 5/0012* (2013.01); *H04L 5/0051* (2013.01)
(58) Field of Classification Search
CPC ..... H04B 1/713; H04L 5/0094; H04L 5/0051; H04L 5/0012; H04L 5/0048
See application file for complete search history.

(56) References Cited

U.S. PATENT DOCUMENTS 10,575,217 B2    2/2020  Manolakos et al.
2019/0109732 A1  4/2019  Choi et al.
(Continued)

FOREIGN PATENT DOCUMENTS

CN    102595514 A    7/2012
CN    104079373 A    10/2014
(Continued)

OTHER PUBLICATIONS

Supplementary European Search Report—EP20951979—Search Authority—The Hague—Apr. 15, 2024.
(Continued)

*Primary Examiner* — Shukri Taha
(74) *Attorney, Agent, or Firm* — QUALCOMM Incorporated

(57) ABSTRACT

In some scenarios, SRS transmission over the full SRS bandwidth may be unnecessary and/or inefficient. Therefore, a need exists for approaches to SRS transmission over less than the full SRS bandwidth. Described herein are techniques and solutions of SRS transmission using only a portion of the full SRS bandwidth, or a partial SRS bandwidth. The present disclosure provides for SRS transmission using a partial SRS bandwidth through sounding patterns that use only the partial SRS bandwidth and/or using a partial SRS bandwidth through various SRS sequence generation configured for the partial SRS bandwidth. An apparatus receives an SRS configuration indicating a full SRS bandwidth; determines a frequency hopping pattern for SRS transmission based on the SRS configuration, and the frequency hopping pattern is limited to a partial SRS bandwidth less than the full SRS bandwidth; and transmits the SRS transmission to the base station based on the frequency hopping pattern.

62 Claims, 12 Drawing Sheets

(56) References Cited

U.S. PATENT DOCUMENTS

| | | | |
|---|---|---|---|
| 2020/0244489 A1 | 7/2020 | Rahman et al. | |
| 2023/0189228 A1* | 6/2023 | Nilsson | H04W 72/0453 |
| | | | 370/329 |
| 2024/0340130 A1* | 10/2024 | Huang | H04L 5/0023 |

FOREIGN PATENT DOCUMENTS

| | | |
|---|---|---|
| CN | 108365937 A | 8/2018 |
| CN | 110383927 A | 10/2019 |
| WO | 2019032182 | 2/2019 |
| WO | 2019066581 A1 | 4/2019 |
| WO | 2020164323 A1 | 8/2020 |

OTHER PUBLICATIONS

International Search Report and Written Opinion—PCT/CN2020/113507—ISA/EPO—May 26, 2021.
Samsung: "SRS Transmission for Wider Bandwidth," 3GPP TSG RAN WG1 Meeting #90, Prague, Czech Republic Aug. 21-25, 2017, (Aug. 25, 2017), R1-1714530, 2 pages, section 2.
3GPP: "3rd Generation Partnership Project, Technical Specification Group Radio Access Network, NR, Physical Channels and Modulation (Release 16)", 3GPP TS 38.211 V16.2.0 (Jun. 2020), Jul. 8, 2020, pp. 1-126.
3GPP TS 38.214: "3rd Generation Partnership Project, Technical Specification Group Radio Access Network, NR, Physical layer procedures for data (Release 16)", 3GPP TS 38.214 V16.2.0, Jun. 2020, pp. 1-163, Jul. 20, 2020.

\* cited by examiner

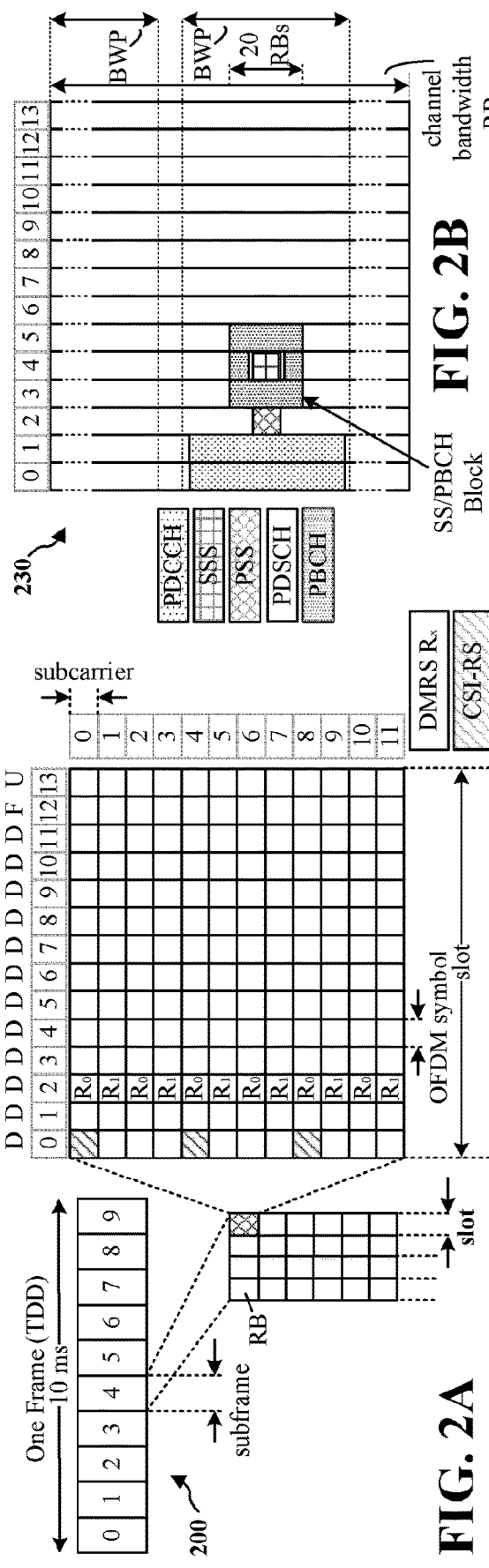
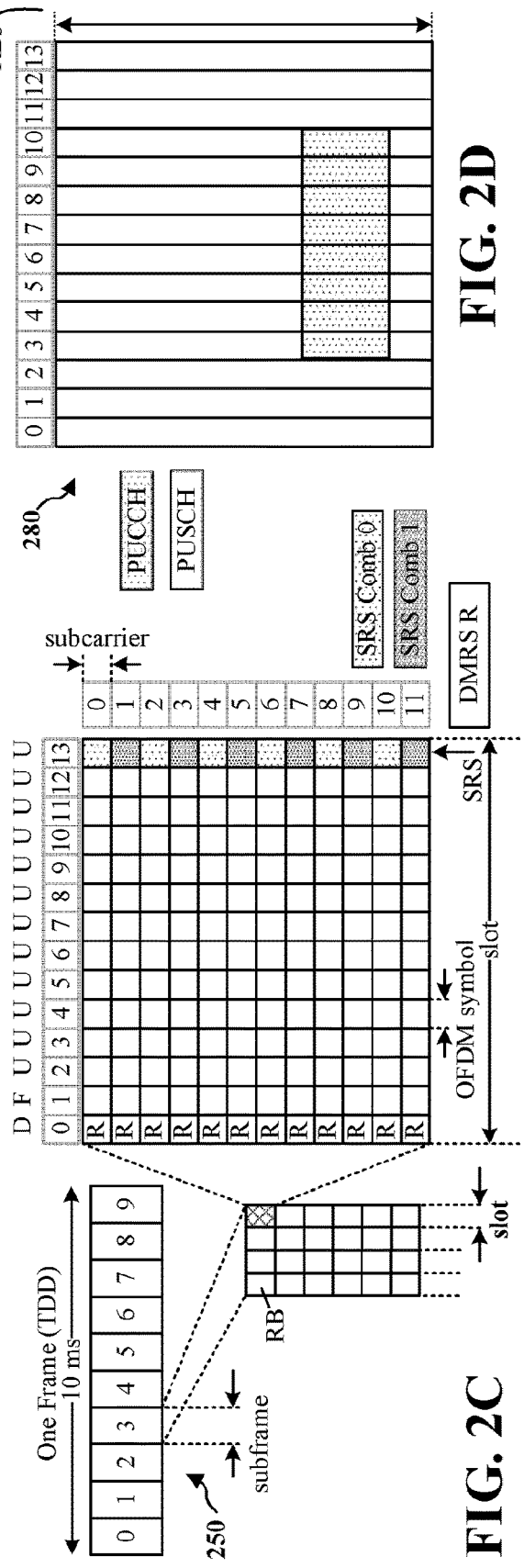
FIG. 2A
FIG. 2B
FIG. 2C
FIG. 2D

METHODS AND APPARATUSES FOR FREQUENCY HOPPING OF SOUNDING REFERENCE SIGNALS IN PARTIAL BANDWIDTHS

CROSS REFERENCE TO RELATED APPLICATION(S)

This application is a National Phase entry of PCT Application No. PCT/CN2020/113507, entitled "METHODS AND APPARATUSES FOR FREQUENCY HOPPING OF SOUNDING REFERENCE SIGNALS IN PARTIAL BANDWIDTHS" and filed on Sep. 4, 2020, which is expressly incorporated by reference herein in its entirety.

BACKGROUND

Technical Field

The present disclosure generally relates to communication systems, and more particularly, to reference signals transmitted from a user equipment to a base station within a certain bandwidth.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In access networks of some example radio access technologies (RATs), such as a 5G New Radio (NR) access network, a base station may estimate at least one channel on which transmissions are received from a user equipment (UE) (e.g., an uplink channel) using at least one sounding reference signal (SRS). Additionally or alternatively, SRS can be used for uplink frequency selective scheduling and/or uplink timing estimation. Accordingly, the UE transmits the at least one SRS to the base station, although the UE may transmit SRS over a wider bandwidth than an uplink channel. In so doing, the UE may sound all ports of an SRS resource in each symbol of the SRS resource.

When a UE transmits SRS, a full bandwidth may be available for the SRS transmission. However, a full SRS bandwidth may be an entire bandwidth of interest, but less than an entire system bandwidth (although the bandwidth of interest potentially may be equal to the system bandwidth). In some aspects, then, a full SRS bandwidth may be configured by a base station for the UE.

Potentially, the UE may be configured to use frequency hopping for SRS. For example, the UE may have insufficient transmission power to sound over the full SRS bandwidth (e.g., when the UE is near a cell edge), and therefore, the base station may configure the UE to use frequency hopping for SRS. When using frequency hopping, however, the UE may still transmit SRS over the full SRS bandwidth, but may do so over multiple symbols (e.g., multiple adjacent symbols).

In some scenarios, SRS transmission over the full SRS bandwidth may be unnecessary and/or inefficient (e.g., in terms of power overhead). Therefore, a need exists for approaches to SRS transmission over less than the full SRS bandwidth.

The present disclosure describes various techniques and solutions of SRS transmission using only a portion of the full SRS bandwidth, or a partial SRS bandwidth. Such techniques and solutions of SRS transmission using a partial SRS bandwidth may allow for UE multiplexing so that a greater number of UEs are able to transmit SRS in a cell. Additionally, SRS transmission using a partial SRS bandwidth may reduce some power overhead incurred by the UE from SRS transmission.

In some aspects, the present disclosure provides for SRS transmission using a partial SRS bandwidth through sounding patterns (e.g., frequency hopping patterns) that use only the partial SRS bandwidth. In some other aspects, the present disclosure provides for SRS transmission using a partial SRS bandwidth through various SRS sequence generation configured for the partial SRS bandwidth.

In one aspect of the disclosure, a method, a computer-readable medium, and an apparatus are provided. The apparatus may be a UE. The apparatus is configured to receive, from a base station, an SRS configuration indicating a full SRS bandwidth. The apparatus is further configured to determine a frequency hopping pattern for SRS transmission based on the SRS configuration, and the frequency hopping pattern may be limited to a partial SRS bandwidth that is less than the full SRS bandwidth. In addition, the apparatus is configured to transmit the SRS transmission to the base station based on the frequency hopping pattern.

In another aspect of the disclosure, another method, another computer-readable medium, and another apparatus are provided. The other apparatus may be a base station. The other apparatus is configured to transmit, to a UE, an SRS configuration indicating a full SRS bandwidth. The other apparatus is further configured to receive, from the UE, an SRS transmission according to a frequency hopping pattern based on the SRS configuration, and the frequency hopping pattern is limited to a partial SRS bandwidth less than the full SRS bandwidth.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
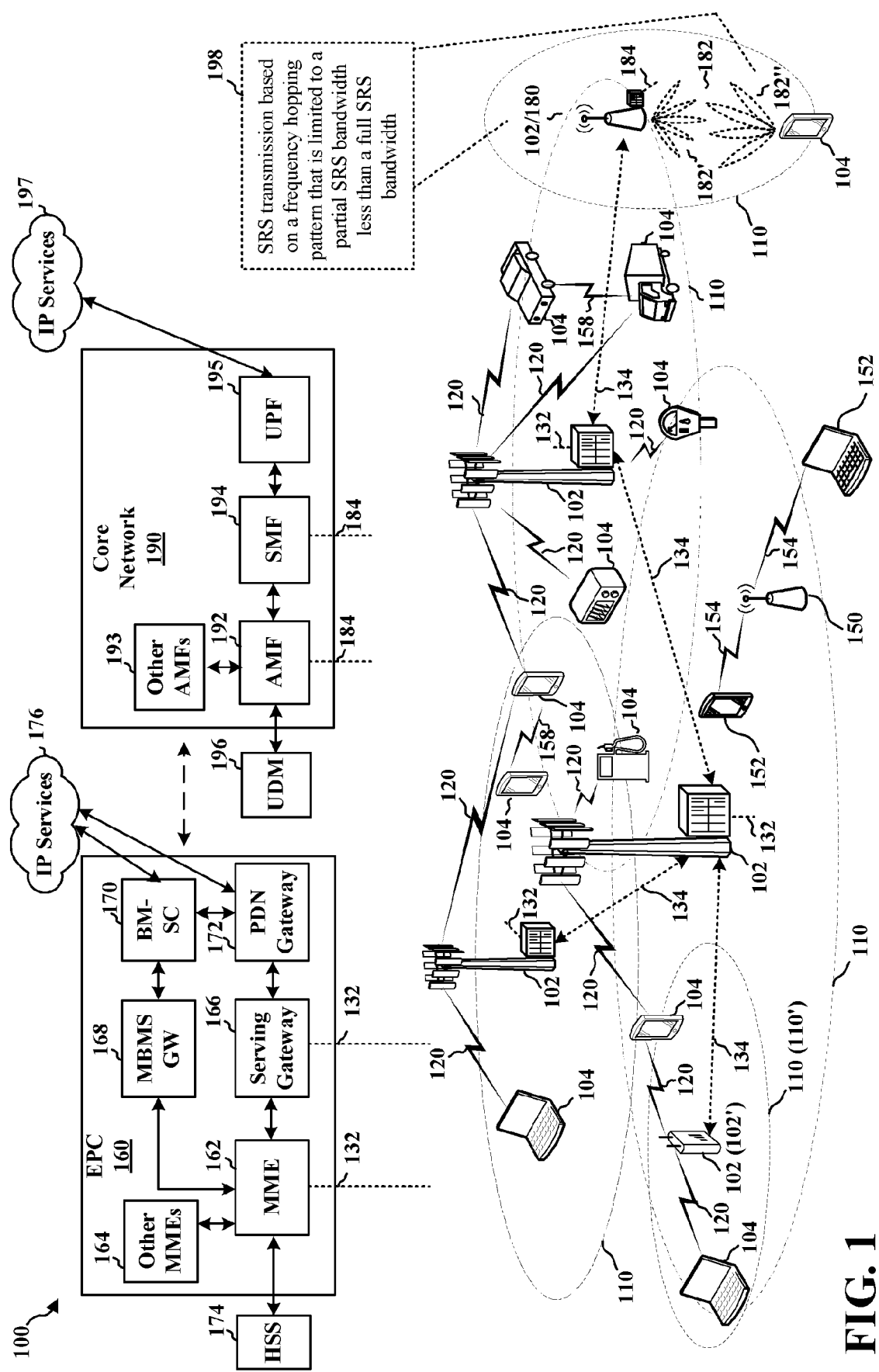
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may be configured to transmit, to the UE 104, a sounding reference signal (SRS) configuration indicating a full SRS bandwidth. The full SRS bandwidth may be a bandwidth of interest over which the UE 104 communicates with the base station 102/180, and therefore, the full SRS bandwidth may be less than the entire system bandwidth (although the full SRS bandwidth potentially may be equal to the entire system bandwidth). The base station 102/180 may be configured to receive, from the UE 104 and based on the SRS configuration, an SRS transmission according to a frequency hopping pattern that is limited to a partial SRS bandwidth less than the full SRS bandwidth (198).

Correspondingly, the UE 104 may be configured to receive, from the base station 102/180, the SRS configuration indicating the full SRS bandwidth. The UE 104 may be further configured to determine, based on the SRS configuration, the frequency hopping pattern for SRS transmission that is limited to the partial SRS bandwidth less than the full SRS bandwidth. Accordingly, the UE 104 may transmit, to the base station 102/180, the SRS transmission based on the frequency hopping pattern that is limited to the partial SRS bandwidth less than the full SRS bandwidth (198).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
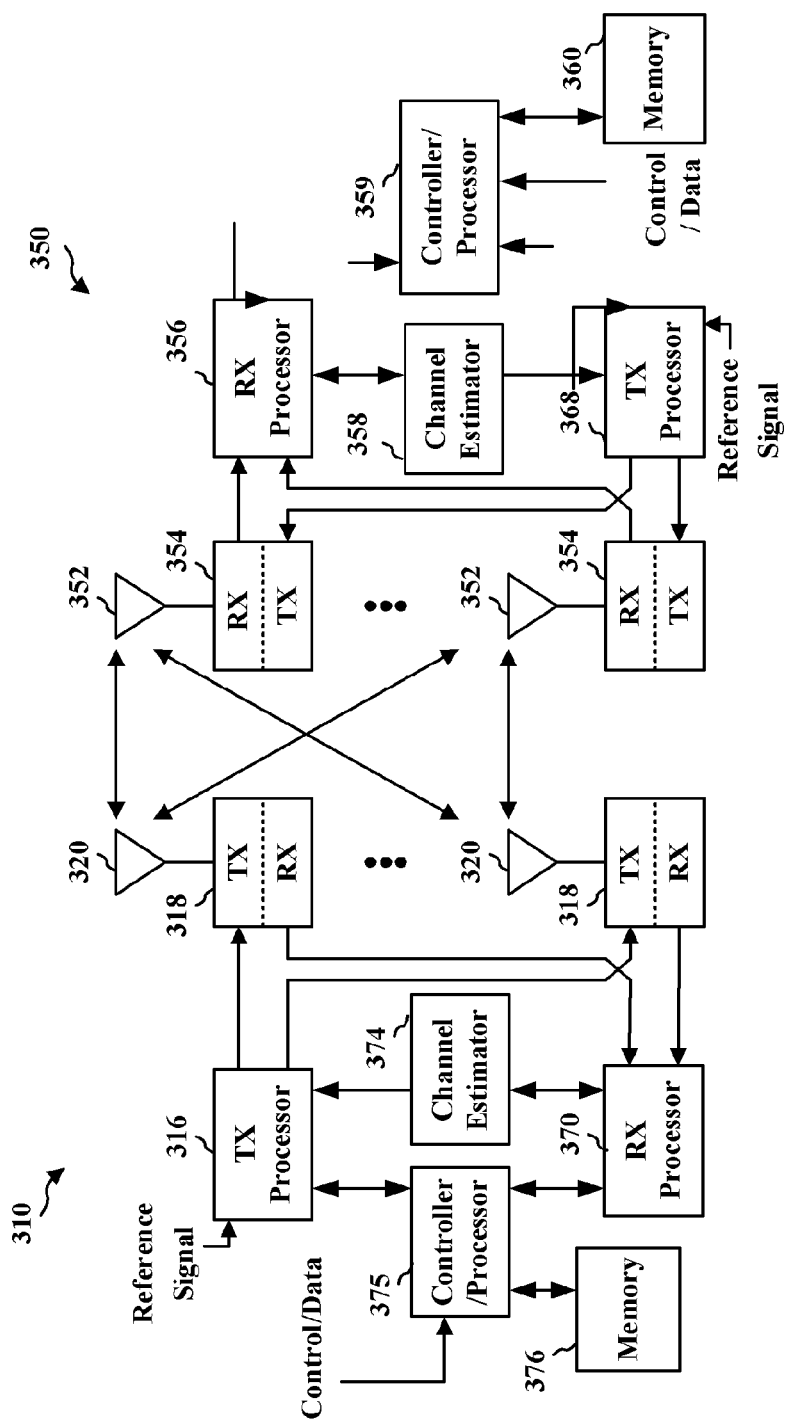
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and/or the controller/processor 359 may be configured to perform aspects in connection with (198) of FIG. 1.

In some other aspects, at least one of the TX processor 316, the RX processor 370, and/or the controller/processor 375 may be configured to perform aspects in connection with (198) of FIG. 1.

Figure 4:
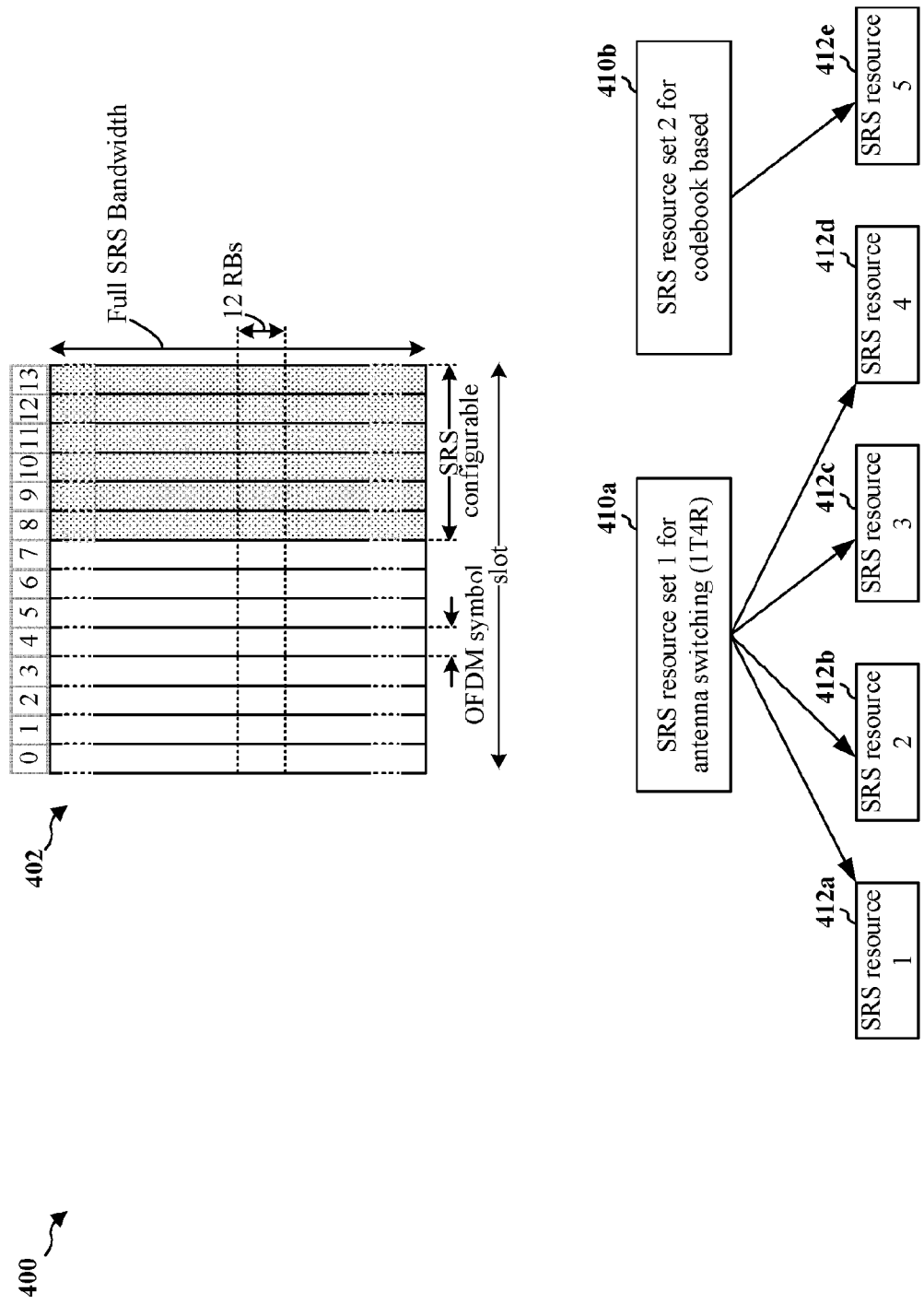
FIG. 4 is a diagram illustrating example configurations for transmission of a sounding reference signal (SRS).

FIG. 4 is a diagram 400 of example configurations of SRS resources. In an access network of an example RAT, such as a 5G NR access network, a base station may estimate at least one channel on which transmissions are received from a UE (e.g., an uplink channel) using at least one SRS, which may be referred to as an SRS resource (although an SRS resource does not necessarily correspond to only one subcarrier over one symbol or an RE). Additionally or alternatively, SRS can be used for uplink frequency selective scheduling and/or uplink timing estimation. Accordingly, the UE transmits the at least one SRS to the base station (see, e.g., FIGS. 2C-2D, supra), although potentially over a wider bandwidth than an uplink channel. The UE may sound all ports of an SRS resource in each symbol of the SRS resource.

According to various aspects, a slot 402 may be configured to include SRS on a set of RBs spanning an entire bandwidth of interest for a base station and a UE. Potentially, the entire bandwidth of interest may be an uplink bandwidth of interest. The bandwidth of interest may be less than an entire system bandwidth; although the bandwidth of interest potentially may be equal to the entire system bandwidth. For example, the bandwidth of interest may be 36, 48, or 64 RBs (although different numbers of RBs are also possible for different bandwidths of interest). In some aspects, a UE may be configured to transmit SRS on the entire bandwidth of interest. Thus, the entire bandwidth of interest may also be referred to in the present disclosure as a "full SRS bandwidth."

A base station may configure the entire bandwidth of interest, and therefore, the base station may signal the full SRS bandwidth to a UE, e.g., as part of an SRS configuration. In some aspects, the base station may signal the full SRS bandwidth and/or other information associated with SRS configuration to the UE via RRC signaling. In some other aspects, the base station may signal the full SRS bandwidth and/or other SRS configuration information using DCI (e.g., information included in DCI and/or a DCI Format) and/or a MAC control element (CE).

In the time domain, the slot 402 may be configured to support SRS resources that span a certain number of symbols, which may be adjacent (e.g., 1, 2, or 4 adjacent symbols) with up to 4 ports per SRS resource. According to some aspects, an SRS may only be transmitted in the last 6 symbols of the slot 402 (e.g., 5G NR Release 15 and Release 16 may support SRS transmission in the last 6 symbols of a slot). According to some other aspects, however, an SRS may be transmitted in any symbols of a slot (e.g., 5G NR Release 17 and beyond potentially may support SRS transmission in more or all symbols of the slot 402).

Additionally or alternatively, the SRS may only be transmitted in a slot after uplink data of that slot, such as uplink data carried on a PUSCH. For example, a PUSCH may be mapped to a subset of the symbols 0 through 13 of the slot 402. Next, the SRS may be mapped to a subset of the remaining symbols 8 through 13 of the slot 402—e.g., the SRS may be mapped to 1, 2, or 4 adjacent symbols within symbols 8 through 13 of the slot 402.

When a UE transmits SRS resources, the SRS resources may be included in an SRS resource set of that UE, such as SRS resource set 1 410a or SRS resource set 2 410b. An SRS resource set may be configured to include one SRS resource or a group of multiple SRS resources, with the SRS resource(s) included therein being based on the use case for which the SRS is transmitted, such antenna switching, codebook-based, non-codebook-based, beam management, and the like. Further, a UE may be configured for aperiodic, semi-persistent, or periodic transmission of an SRS resource set, e.g., with aperiodic transmission of an SRS resource set being signaled from the base station to the UE via DCI.

Illustratively, for SRS antenna switching use cases, 1 or 2 TX to 2 or 4 RX antenna switching may be supported, which may be denoted as "1T2R," "2T4R," "1T4R," and "1T4R/2T4R" where a UE supports both 1 TX to 4 RX and 2 TX to 4 RX antenna switching (however, antenna switching in which the numbers of TX and RX are equal may also be supported). To support antenna switching, an SRS resource set is configured with two (for 1T2R or 2T4R) or four (for 1T4R) SRS resources transmitted in different symbols. Each SRS resource includes one (for 1T2R or 1T4R) or two (for 2T4R) antenna port(s), and the SRS port(s) of each SRS resource is associated with different UE antenna port(s).

As shown in one example of FIG. 4, the SRS resource set 1 410a is based on 1T4R, and therefore includes four SRS resources 1 through 4 412a-d. The four SRS resources 1 through 4 412a-d may occur in one slot, such as within four adjacent symbols of symbols 8 through 13 of the slot 402. However, other configurations may also be supported. For example, for 1T4R, two aperiodic SRS resource sets with a total of four SRS resources transmitted in different symbols of two different slots may be configured, instead of SRS resources 1 through 4 412a-d in one slot.

As shown in another example of FIG. 4, the SRS resource set 2 410b may be based on a use case of codebook-based transmission (e.g., for beamforming), such as when feedback of precoding information (e.g., PMI) and/or other information is configured to increase throughput at the receiver side (e.g., base station). The SRS resource set 2 410b may include one SRS resource 5 412e based on codebook-based transmission. The SRS resource 5 412e may be transmitted in a single symbol (e.g., one of symbols 8 through 13 of the slot 402), and therefore, the SRS resource 5 412e may be wideband in that the SRS resource 5 412e may span the full SRS bandwidth.

Figure 5:
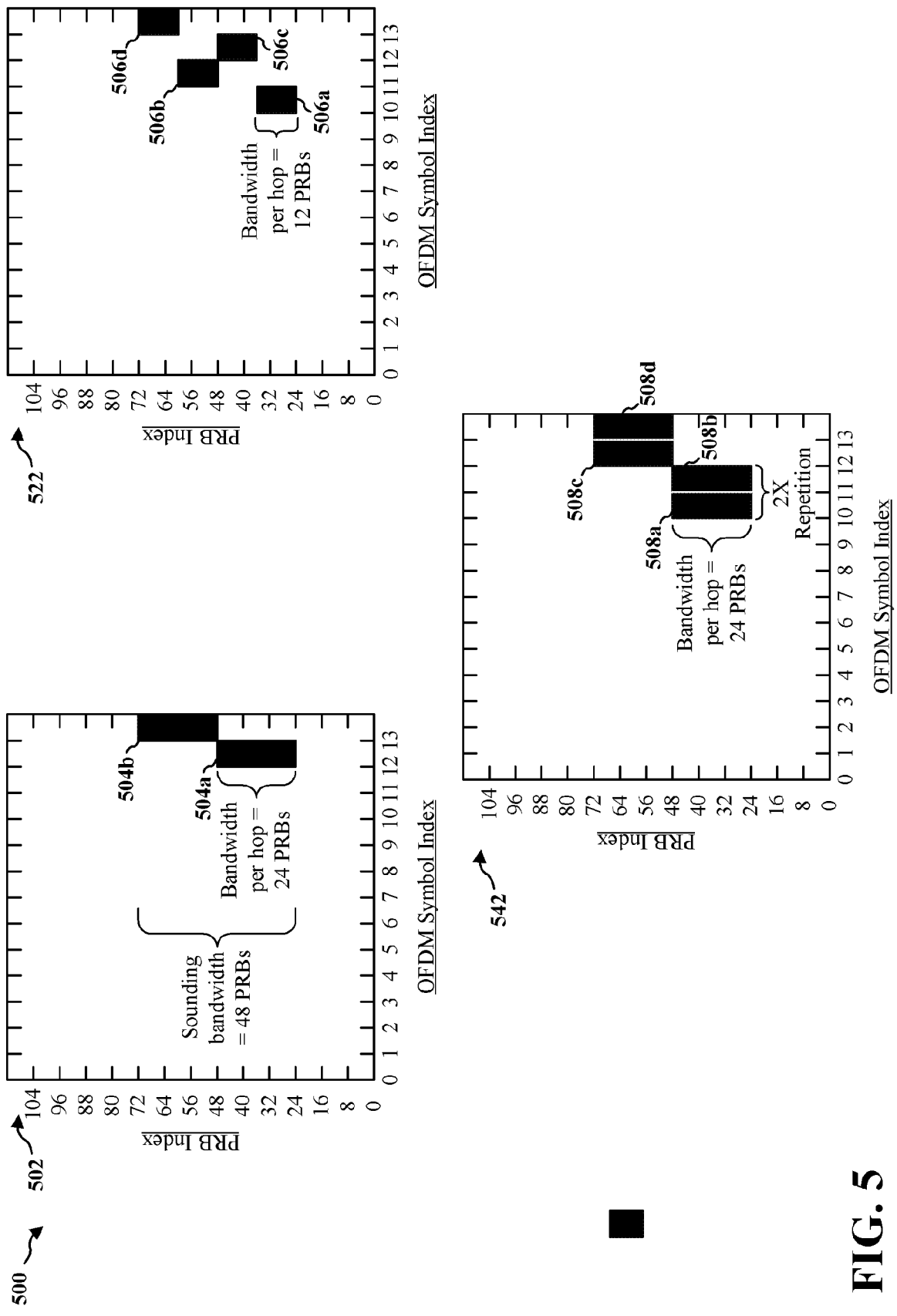
FIG. 5 is a diagram illustrating example resource mappings of SRS resources.

FIG. 5 is a diagram 500 of example frequency hopping for SRS transmission. As described, supra, an SRS resource set may span a full SRS bandwidth. For example, one SRS resource may span the full SRS bandwidth so that the full SRS bandwidth may be sounded over one symbol. However, an SRS resource set may not span the full SRS bandwidth in symbol; rather, the SRS resource set may include one or more SRS resources that span the full SRS bandwidth over multiple symbols.

To that end, a UE may be configured to use frequency hopping for an SRS resource set. For example, the UE may have insufficient transmission power to sound over the full SRS bandwidth (e.g., when the UE is near a cell edge), and therefore, a base station may configure the UE to use frequency hopping for SRS transmission. When using frequency hopping, however, the UE may still transmit SRS over the full SRS bandwidth, but may do so over multiple symbols (e.g., multiple adjacent symbols).

According to the examples shown in FIG. 5, a full SRS bandwidth (or sounding bandwidth) may be configured to be 48 PRBs. A UE may sound over the full SRS bandwidth according to different SRS frequency hopping patterns 502, 522, 542. An SRS resource may be transmitted at each hop, with each hop spanning a fractional amount of the full SRS bandwidth (e.g., one half or one quarter of the full SRS bandwidth) over one symbol.

For example, in the first SRS frequency hopping pattern 502, SRS resource 504 may be transmitted over two adjacent symbols 12 and 13 of at least one slot. Each of the SRS resource 504 may span 24 PRBs of a different half of the full SRS bandwidth so that all 48 PRBs of the full SRS bandwidth are sounded over two adjacent symbols.

In the example of the second SRS frequency hopping pattern 522, SRS resource 504 may be transmitted over four adjacent symbols 10 through 13 of at least one slot. The SRS resources 504 may span 12 PRBs of a different quarter of the full SRS bandwidth so that all 48 PRBs of the full SRS bandwidth are sounded over four adjacent symbols.

In the example of the third SRS frequency hopping pattern 542, SRS resource 504 may be transmitted over four adjacent symbols 10 through 13 of at least one slot. SRS resource 504 may span 24 PRBs of the full SRS bandwidth.

Different from the first two SRS frequency hopping patterns 502, 522, however, the SRS resource may be repeating. For example, SRS resource 504 may repeat over symbols 10 and 11, and SRS resource 504 may repeat over symbols 12 and 13. Such repetition may increase the effectiveness of sounding over each 24 PRB bandwidth, e.g., relative to sounding each half or quarter of the 48 PRB bandwidth only once per symbol.

In some scenarios, transmission of SRS resource sets that span the full SRS bandwidth may be unnecessary and/or inefficient (e.g., in terms of power overhead). For example, sounding over only a portion of the full SRS bandwidth may be sufficient for some channel estimation, uplink timing alignment, and/or uplink frequency selective scheduling by a base station. Additionally or alternatively, a UE may operate within power constraints that prevent the UE from sounding the full SRS bandwidth, such as when a UE has an insufficient amount of remaining battery charge or when a UE is configured as a low-power device capable of achieving comparatively lower transmission power than other UEs. In still other examples, a base station may provide a cell in which the number of transmitting UEs exceeds the uplink resources available for SRS transmission without some additional mechanism for multiplexing. Therefore, a need exists for approaches to SRS transmission over less than the full SRS bandwidth.

The present disclosure, and FIGS. 6-12 in particular, describes various techniques and solutions of SRS transmission using only a portion of the full SRS bandwidth, or a partial SRS bandwidth. Such techniques and solutions of SRS transmission using a partial SRS bandwidth may allow for UE multiplexing so that a greater number of UEs are able to transmit SRS in a cell. Furthermore, SRS transmission using a partial SRS bandwidth may reduce some power overhead, such as that incurred by UEs from SRS transmission and/or base stations from SRS reception.

In FIGS. 6-12, some techniques and solutions of SRS transmission using a partial SRS bandwidth are provided through sounding patterns (e.g., frequency hopping patterns) that use only a partial SRS bandwidth, which may be a fractional amount of a full SRS bandwidth. Some other solutions of SRS transmission using a partial SRS bandwidth are provided in FIGS. 6-12 through generation of various SRS sequences configured for use with a partial SRS bandwidth that is less than the full SRS bandwidth.

Figure 6:
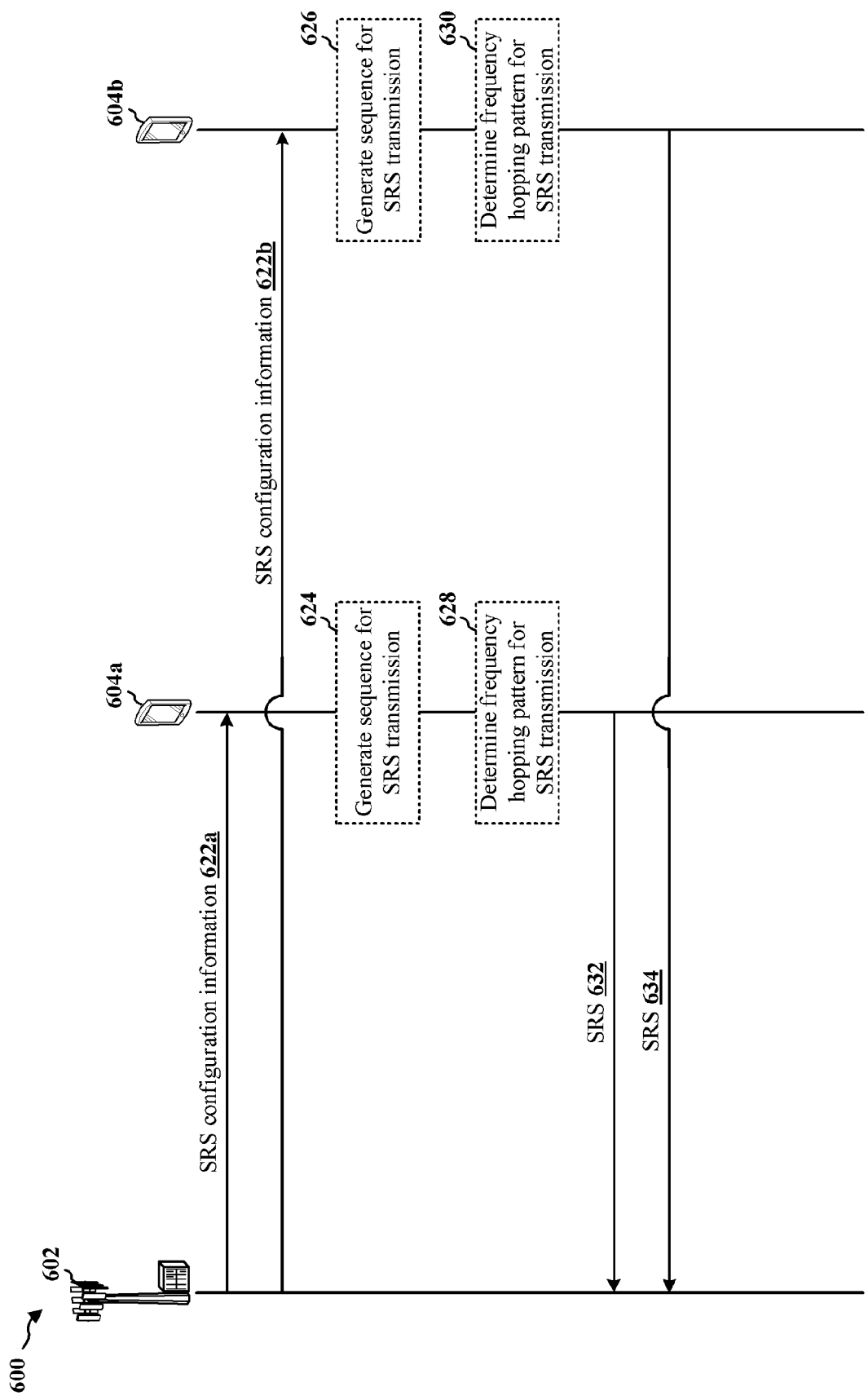
FIG. 6 is a call flow diagram illustrating example operations for SRS transmissions by UEs to a base station.

With reference to FIG. 6, a call flow diagram 600 illustrates various operations for SRS transmission using a partial SRS bandwidth that is less than a full SRS bandwidth. In FIG. 6, a base station 602 may be configured to provide a cell on which multiple UEs 604a-b operate. For example, referring to FIGS. 1 and 3, the base station 602 may be implemented as a base station 102/180, 310, and each of the UEs a-b may be implemented as a UE 104, 350.

Each of the UEs 604a-b may be configured to transmit data and/or control information to the base station 602. Transmission in such direction may be regarded as uplink. Uplink data may be carried on an uplink data channel, such as a PUSCH. The base station 602 may configure PUSCH transmission for each of the UEs 604a-b on a respective active BWP, which may be updated by the base station 602.

To increase the accuracy and success of decoding uplink data received from the UEs 604a-b, the base station 602 may perform channel estimation, e.g., in order to model current channel conditions for reliably receiving uplink data from the UEs 604a-b with a high data rate. The channel estimation may be performed over an entire bandwidth of interest, which may be greater than any one active BWP (e.g., the entire bandwidth of interest for the UEs 604a-b may be the entire bandwidth spanned by all BWPs that potentially may be activated by the base station 602 for the UEs 604a-b).

Each of the UEs 604a-b may be able to sound over a bandwidth by transmitting an SRS resource set including one or more SRS resources. For example, each of the UEs 604a-b may sound all SRS ports in one or more symbols of an SRS resource set. In some aspects, at least one of the UEs 604a-b may sound over the entire bandwidth of interest, or full SRS bandwidth, by transmitting an SRS resource set including one or more SRS resources that span the full SRS bandwidth in the aggregate. In some other aspects, however, at least one of the UEs 604a-b may sound over a fractional amount of the entire bandwidth of interest, or a partial SRS bandwidth that is less than the full SRS bandwidth, by transmitting an SRS resource set including one or more SRS resources that span the partial SRS bandwidth and not the full SRS bandwidth.

The base station 602 may configure the UEs 604a-b for sounding by transmitting SRS configuration information 622a-b to the UEs 604a-b. In some aspects, each of the SRS configuration information 622a-b may be individually configured for each of the UEs 604a-b. Thus, the base station 602 may transmit, to the first UE 604a, first SRS configuration information 622a that is different from second SRS configuration information 622b transmitted by the base station 602 to the second UE 604b.

According to various aspects, each of the SRS configuration information 622a-b may include and/or indicate any information associated with SRS transmission. Each of the SRS configuration information 622a-b may be transmitted in one or more messages that may be signaled in the same or different type or format, such as RRC signaling, DCI, and/or MAC CE. For example, the base station 602 may signal the first SRS configuration information 622a to the first UE 604a using RRC signaling, DCI, and a MAC CE at respective times such that a first portion of the first SRS configuration information 622a is signaled via RRC signaling at time t, a second portion of the first SRS configuration information 622a is signaled via DCI at time t+x, and a third portion of the first SRS configuration information 622a is signaled via MAC CE at time t+y.

The base station 602 may configure an entire bandwidth of interest, also referred to as a "full SRS bandwidth," for each of the UEs 604a-b. The base station 602 may transmit information indicating a full SRS bandwidth to each of the UEs 604a-b in a respective one of the first and second SRS configuration information 622a-b. For example, the base station 602 may indicate the full SRS bandwidth via RRC signaling; although the full SRS bandwidth may be configured via DCI or MAC CE according to other aspects.

In either the same or a different message, the base station 602 may include, in at least one of the SRS configuration information 622a-b, a periodicity or duration for SRS transmission. The periodicity (or duration) may indicate whether SRS transmission is periodic or aperiodic, or potentially semi-persistent.

In some aspects, the SRS transmission periodicity may be configured via RRC signaling as aperiodic, but the base station 602 may activate SRS transmission from one of the UEs 604a-b via DCI. In some other aspects, the SRS transmission periodicity may be configured via RRC signaling as periodic, and such RRC signaling may further configure a number of ms for the periodicity, as well as a subframe offset for the periodicity.

Additionally, the base station 602 may include, in at least one of the SRS configuration information 622a-b, a frequency domain position that defines the starting position of SRS transmission in the frequency domain. For example, the frequency domain position (e.g., labeled freqDomainPosition) may have a value for an index of the lowest RB (or PRB) to be spanned by SRS transmission.

As described with respect to FIG. 2C, supra, SRS transmission may not occur on every subcarrier of an RB (or PRB). Rather, an SRS resource may be mapped to every other subcarrier of an RB in a transmission comb structure, starting either with the first (e.g., lowest) subcarrier or the second (e.g., next consecutive following the lowest) subcarrier.

Thus, the base station 602 may include, in at least one of the SRS configuration information 622a-b, a value for transmission comb (e.g., labeled transmissionComb). The transmission comb value may configure one of the UEs 604a-b to transmit on every even subcarrier (e.g., transmission comb 0 starting with subcarrier index 0) or every odd subcarrier (e.g., transmission comb 1 starting with subcarrier index 1).

To preserve orthogonality, the base station 602 may include, in at least one of the SRS configuration information 622a-b, a value for a cyclic shift to be applied by one of the UEs 604a-b for SRS transmission. For example, the cyclic shift value (e.g., labeled cyclicShift) may include a value inclusively between 1 and 8 (although more, fewer, or different values are also possible). Illustratively, when UEs 604a-b share the same full SRS bandwidth according to SRS configuration information 622a-b, SRS transmissions of the UEs 604a-b may be multiplexed in the full SRS bandwidth because respective different cyclic shifts will maintain orthogonality.

According to some aspects, the base station 602 may include, in at least one of the SRS configuration information 622a-b, a bandwidth of SRS resource(s) of an SRS resource set. For example, the SRS resource bandwidth (e.g., labeled srs-Bandwidth) may indicate a number of RBs (or PRBs) to be spanned by each of the one or more SRS resource(s) configured to be included in an SRS resource set of at least one of the UE 604a-b.

Relatedly, the base station 602 may include, in at least one of the SRS configuration information 622a-b, information configuring a hopping bandwidth for SRS transmission (e.g., labeled srs-HoppingBandwidth). That is, the SRS hopping bandwidth may be a number of consecutive RBs (or PRBs), starting from the frequency domain position, that span the entire bandwidth of interest. Thus, in some aspects, the SRS hopping bandwidth may be equal to the full SRS bandwidth.

At least one of the SRS configuration information 622a-b may include a respective value for each of the SRS resource bandwidth and the SRS hopping bandwidth. The respective values may implicitly indicate a respective number of RBs (or PRBs) to be spanned by each of the SRS resource bandwidth and the SRS hopping bandwidth. For example, each of the respective values may be associated with a respective table (e.g., a lookup table) or similar keyed or indexed data structure, which may be (pre-)configured in at least one of the UEs 604a-b.

Each of the respective values may correspond to a row, column, or other entry of the associated table, and the number of RBs (or PRBs) configured for the SRS resource bandwidth or the SRS hopping bandwidth may be explicitly or implicitly included in the row, column, or other entry corresponding to the respective value indicated in the at least one of the SRS configuration information 622a-b.

By way of illustration, the first SRS configuration information 622a may include a value for the SRS resource bandwidth of bw3, and further, may include a value for the SRS hopping bandwidth of hbw0. The first UE 604a may identify a row, column, or other entry of at least one table that corresponds to bw3, and may derive a number of RBs (or PRBs) configured to be spanned by each SRS resource from the corresponding row, column, or other entry—e.g., the SRS resource bandwidth may be equal to 4. Similarly, the first UE 604a may identify a row, column, or other entry of at least one table that corresponds to hbw0, and may derive a number of RBs (or PRBs) configured all the bandwidth of interest—e.g., the full SRS bandwidth—from the corresponding row, column, or other entry—e.g., the SRS hopping bandwidth may be equal to 48.

According to some aspects, at least one of the UEs 604a-b may determine whether SRS frequency hopping is enabled or disabled based on information implicitly signaling in a respective one of the SRS configuration information 622a-b. Specifically, at least one of the UE 604a-b may derive an enabled or disabled state of SRS frequency hopping from a combination of the respective values configured for the SRS resource bandwidth and the SRS hopping bandwidth.

For example, when at least one of the SRS configuration information 622a-b includes a value of the SRS hopping bandwidth (e.g., hbw0, hbw1, hbw2, or hbw3) configured to be less than a value of the SRS resource bandwidth (e.g., bw0, bw1, bw2, or bw3), then SRS frequency hopping may be enabled. However, when at least one of the SRS configuration information 622a-b includes a value of the SRS hopping bandwidth (e.g., hbw0, hbw1, hbw2, or hbw3) configured to be greater than or equal to a value of the SRS resource bandwidth (e.g., bw0, bw1, bw2, or bw3), then SRS frequency hopping may be disabled. Thus, as shown in the foregoing illustration, SRS frequency hopping is enabled for the first UE 604a because the SRS resource bandwidth of bw3 is greater than the SRS hopping bandwidth of hbw0. In effect, then, the first UE 604a may use 4 RBs configured for each SRS resource (e.g., symbol) for frequency hopping over the 48 RBs bandwidth configured for the SRS hopping bandwidth (e.g., the full SRS bandwidth).

In some aspects, at least one of the UEs 604a-b may be configured for SRS frequency hopping over the full SRS bandwidth. For example, the second UE 604b may be configured for SRS frequency hopping over the full SRS bandwidth. Therefore, SRS resource(s) of an SRS resource set configured for the second UE 604b may span the full SRS bandwidth over one or more symbols.

Figure 7:
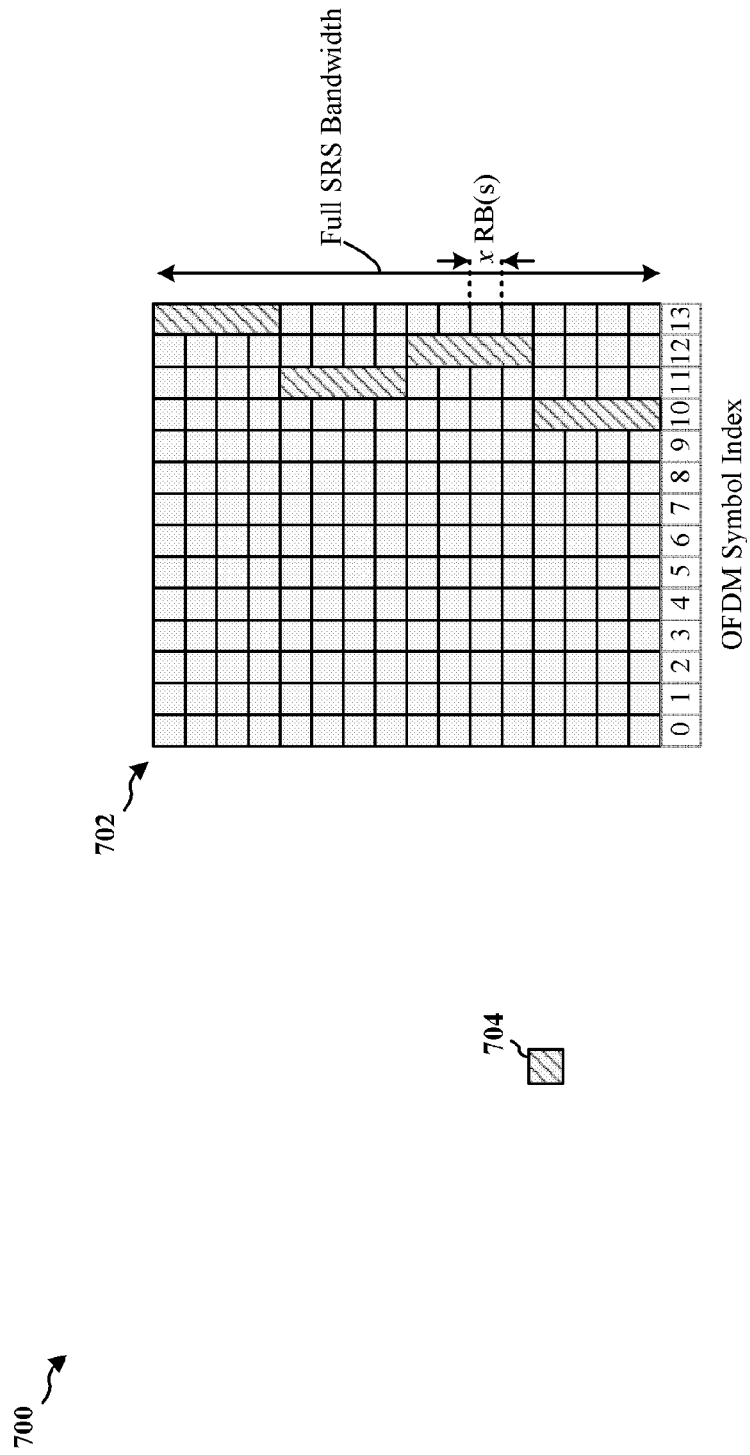
FIG. 7 is a diagram illustrating an example frequency hopping pattern for an SRS resource over a full bandwidth configured for SRS.

Referring to FIG. 7, for example, a diagram 700 illustrates a full SRS bandwidth frequency hopping pattern 702. By way of illustration, the full SRS bandwidth may be configured to span 16× RBs (e.g., with 12 subcarriers per RB). In one example aspect, x may be equal to 4 RBs, and therefore, the full SRS bandwidth may be equal to 64 RBs (e.g., 768 subcarriers with 12 subcarriers per RB). However, x may be different from (e.g., greater than) 4 in some other aspects.

The second UE 604b may be configured with SRS resource 704. The SRS bandwidth for the second UE 604b may be equal to 16 RBs, and the SRS hopping bandwidth may be equal to 64 RBs. Thus, the second UE 604b may transmit SRS resource 704 on a respective (unique) 16 RB bandwidth over a respective one of symbol indices 10 through 13, and so the second UE 604b may sound over the full 64 RB bandwidth.

In order for SRS resource 704 to span a respective portion of the full SRS bandwidth, an SRS frequency hopping pattern for the full SRS bandwidth may be configured. The SRS frequency hopping pattern may define a respective hopping bandwidth (e.g., a set of contiguous RBs) for each hop, with each hop occurring at a respective symbol of at least one slot.

In the context of FIG. 7, for example, a full SRS bandwidth frequency hopping pattern may define a unique 16 RB bandwidth for each hop at a respective one of symbols 10 through 13 (e.g., assuming x=4). Accordingly, the second UE 604b transmits SRS on the first 16 RBs of the full SRS bandwidth at the first hop for symbol 10. At the next hop over symbol 11, the second UE 604b transmits SRS on 16 RBs starting after the first 32 RBs of the full SRS bandwidth (e.g., from subcarrier index 383 to subcarrier index 575, with subcarrier indices from 0, 1, 2, ..., 765, 766, 768 for x=4 RBs). At the third hop over symbol 12, the second UE 604b transmits SRS on 16 RBs starting after the first 16 RBs of the full SRS bandwidth and ending with the $32^{nd}$ RB. At the final hop over symbol 13, the second UE 604b transmits SRS on 16 RBs starting after the first 48 RBs and ending with the last ($64^{th}$) RB of the full SRS bandwidth. Thus, the full SRS bandwidth is sounded by the SRS resource 704, as the SRS resource 704 spans all RBs of the full SRS bandwidth over four symbol hops occurring at symbols 10 through 13.

Referring again to FIG. 6, at least one of the UEs 604a-b may be configured to use an SRS frequency hopping pattern that only uses a portion of the full SRS bandwidth—that is, a partial SRS bandwidth that is less than the full SRS bandwidth. In effect, at least one of the UEs 604a-b may be configured with SRS resource(s) of an SRS resource set that spans the partial SRS bandwidth but not the full SRS bandwidth. Sounding over the partial SRS bandwidth that is less than the full SRS bandwidth may be more efficient (e.g., in terms of power overhead and/or UE capacity), while still being sufficient for channel estimation, uplink frequency selective scheduling, uplink timing estimation, and so forth by the base station 602.

In order to transmit SRS resources, however, the UEs 604a-b may generate 624, 626 SRS sequences. In some aspects, SRS sequence generation may be based on the SRS configuration information. For example, the first UE 604a may generate 624 an SRS sequence based on at least one of the full SRS bandwidth (e.g., SRS hopping bandwidth), the SRS bandwidth, the starting frequency position, the transmission comb, and/or one or more other parameters indicated in the SRS configuration information 622a. The first UE 604a may be configured (e.g., preconfigured) with a function or other algorithm that takes one or more of the aforementioned parameters as inputs, and returns the SRS sequence as an output according to evaluation of the function/algorithm with the input parameters.

While an SRS sequence may be generated based on the full SRS bandwidth, one of the UEs 604a-b may be configured to truncate the SRS sequence when transmitting SRS on a partial SRS bandwidth. For example, the first UE 604a may generate an SRS sequence based on the full SRS bandwidth configured by the base station 602, but may refrain from mapping a subsequence of the SRS sequence to those resources (e.g., REs) outside of the partial SRS bandwidth. The subsequence may map to part(s) of the full SRS bandwidth outside of the partial SRS bandwidth over one or more omitted symbol hops, whereas the truncated SRS sequence may be carried on the part(s) of the full SRS bandwidth included in the partial SRS bandwidth over one or more other symbol hops.

In some other aspects, SRS sequence generation may be based on a partial SRS bandwidth, which may be indicated by at least one of SRS configuration information 622a-b for at least one of the UEs 604a-b that supports SRS transmission on a partial SRS bandwidth. For example, the first UE 604a may generate 624 an SRS sequence based on at least the partial SRS bandwidth, and potentially based further on at least one of the full SRS bandwidth (e.g., SRS hopping bandwidth), the SRS bandwidth, the starting frequency position, the transmission comb, and/or one or more other parameters indicated in the SRS configuration information 622a. The first UE 604a may be configured (e.g., preconfigured) with a function or other algorithm that takes at least the partial SRS bandwidth (e.g., number and/or position of RB(s) included in the partial SRS bandwidth) as an input, and returns the SRS sequence as an output according to evaluation of the function/algorithm with the input parameters.

Potentially, not all UEs may support SRS transmission on a partial SRS bandwidth (e.g., some legacy UEs may lack such support). Therefore, at least one cyclic shift may be used for an SRS sequence that is based on the partial SRS bandwidth. The at least one cyclic shift may be different from another cyclic shift used for another SRS sequence that is based on the full SRS bandwidth—e.g., a different cyclic shift per subband may be used. Different cyclic shifts used for SRS transmissions on partial and full SRS bandwidths may reduce interference by UEs transmitting SRS on the partial SRS bandwidth to UEs transmitting SRS on the full SRS bandwidth (e.g., legacy UEs).

In still other aspects, a new SRS sequence may be configured for use on a partial SRS bandwidth. When such a new SRS sequence is transmitted on a partial SRS bandwidth, the new SRS sequence may be orthogonal to another SRS sequence generated based on (and transmitted on) the full SRS bandwidth (e.g., legacy generation of an SRS sequence). For example, the first UE 604a may generate 624 a new SRS sequence configured for use on a partial SRS bandwidth that is less than a full SRS bandwidth.

In connection with generating a respective SRS sequence, each of the UEs 604a-b may determine 628, 630 a respective frequency hopping pattern for SRS transmission. At least one of the UEs 604a-b may determine an SRS frequency hopping pattern for a partial SRS bandwidth that is less than a full SRS bandwidth. Further, a respective partial SRS bandwidth frequency hopping pattern may be periodic, aperiodic, or semi-persistent, e.g., as indicated according to one of the SRS configuration information 622a-b. In some aspects, at least one of the UEs 604a-b may determine 628, 630 a respective partial SRS bandwidth frequency hopping pattern based at least in part on a respective one of the generated SRS sequences.

In some other aspects, the base station 602 may configure a respective SRS frequency hopping pattern for at least one of the UEs 604a-b, and therefore, at least one of the UEs 604a-b may determine 628, 630 a respective SRS frequency hopping pattern according to the configuration received from the base station 602. For example, the base station 602 may transmit, to each of the UEs 604a-b, a respective one of SRS configuration information 622a-b that indicates a partial bandwidth (e.g., number and position of RBs) on which to transmit an SRS resource at each hop, with each hop occurring over one symbol of a set of adjacent symbols.

In various further aspects, the base station 602 may implicitly indicate a respective SRS frequency hopping pattern to at least one of the UEs 604a-b. Accordingly, at least one of the UEs 604a-b may determine (e.g., compute, derive, etc.) a respective bandwidth position (e.g., starting frequency position, starting RB position, ending frequency position, etc.) corresponding to each symbol hop for SRS resource transmission.

In still additional aspects, at least one of the UEs 604a-b may determine an SRS frequency hopping pattern for the full SRS bandwidth (e.g., based on a respective one of the SRS configuration information 622a-b). At least one of the UEs 604a-b may then determine the partial SRS bandwidth frequency hopping pattern by determining a portion of the SRS transmission to be omitted. For example, at least one of the UEs 604a-b may determine a frequency hopping pattern for the full SRS bandwidth, but may subsequently determine the frequency hopping pattern for the partial SRS bandwidth by determining to refrain from SRS transmission on some portion of the full SRS bandwidth.

When determined, an SRS frequency hopping pattern for a partial SRS bandwidth may define, for SRS resource(s) of an SRS resource set, at least one of: (1) a subset of a set of RBs per symbol (e.g., per hop) of a set of symbols (e.g., a set of hops) for SRS transmission, and/or (2) a subset of the set of symbols for SRS transmission. In effect, at least one of the UEs 604a-b may refrain from transmitting SRS resource(s) on one or more RBs of at least one symbol hop of a partial SRS hopping pattern and/or refrain from transmitting SRS resource(s) at one or more symbol hops of a partial SRS hopping pattern (e.g., such that all RBs of the one or more symbol hops are skipped).

Figure 8:
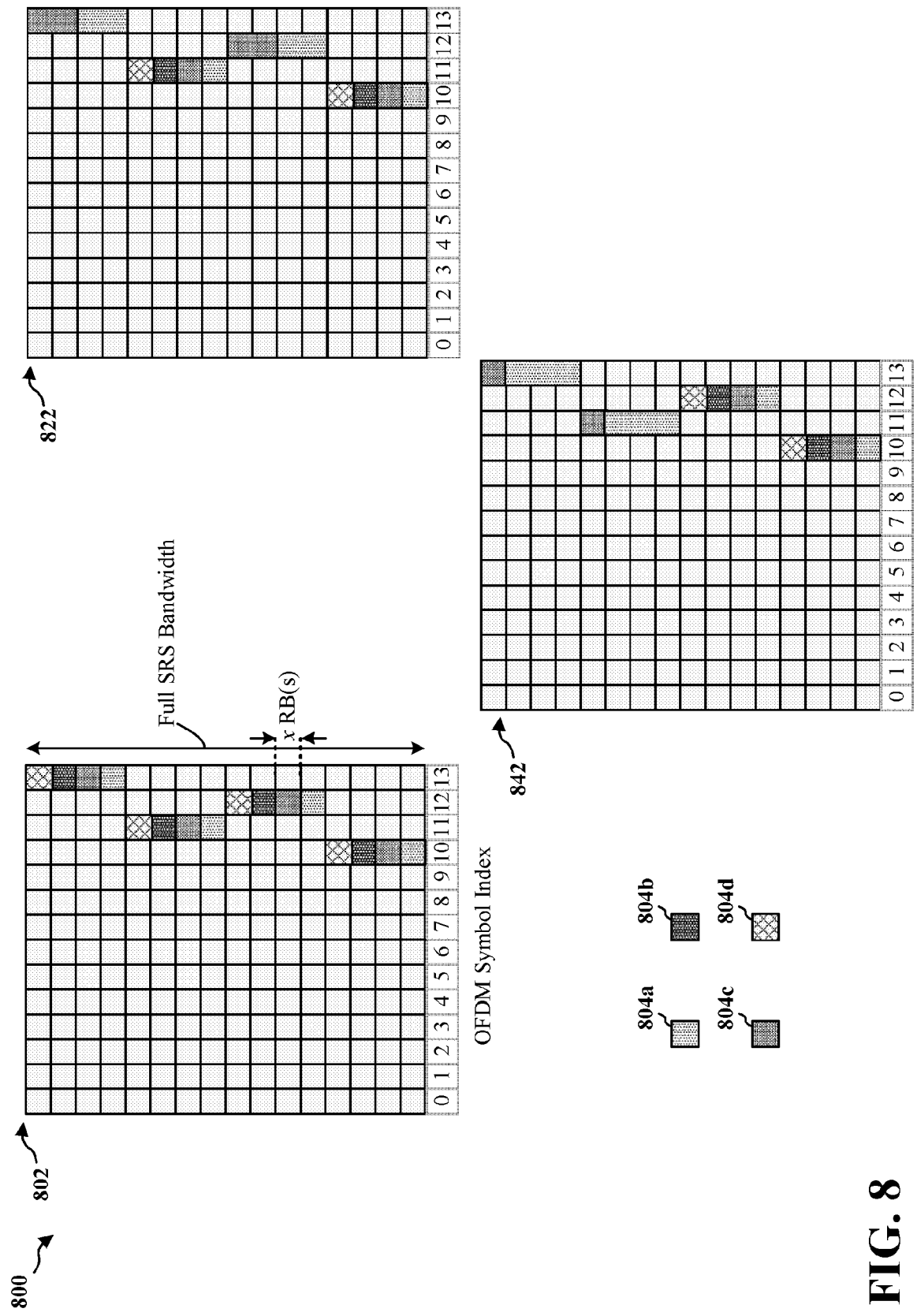
FIG. 8 is a diagram illustrating example frequency hopping patterns for SRS transmission over a partial bandwidth of a full bandwidth configured for SRS.

Referring to FIG. 8, for example, a diagram 800 illustrates example partial SRS bandwidth frequency hopping patterns 802, 822, 842. According to the partial SRS bandwidth frequency hopping patterns 802, 822, 842 of FIG. 8, the frequency resources (e.g., RBs) of each hop may be divided into N sub-resources (or "sub-hops"). Therefore, SRS transmission by one UE would occur on only one of the N sub-resources that the resources of each hop is divided. For example, SRS transmission by one UE would only occur on a subset of the set of 4× RBs per symbol hop. Effectively, hopping over each symbol hop may be viewed as an outer loop, and the partial SRS frequency hopping pattern may introduce an inner loop so that one UE only hops to one of the N sub-resources into which the resources of each symbol hop is divided. Potentially, the frequency resources of each sub-hop (e.g., the N sub-resources) may be greater than 4 RBs or may be greater than or equal to 4 RBs (although other numbers of frequency resources are possible).

In some aspects, the ratio of sub-hop frequency resources to hop frequency resources may be configured based on a threshold (e.g., a predefined threshold). For example, the ratio of sub-hop frequency resources to hop frequency resources may be constrained to be within a threshold. Illustratively, the threshold may be equal to ½, and the base station 602 may divide the 4× RBs of each hop into 4 sub-hops of 1 RB each so that the ratio of sub-hop frequency resources to hop frequency resources is ¼, which is within the threshold of ½.

According to some aspects shown by the first partial SRS bandwidth frequency hopping pattern 802, each of the sub-hops of a symbol hop includes the same number of resources—e.g., each sub-hop of a symbol hop includes x RBs—and further, each of the hops has the same number of sub-hops—e.g., each hop has 4 sub-hops. For example, each symbol hop may include 4× RBs, where x may be equal to 4 or x may be greater than 4 (although other values are possible). The 4× RBs of each symbol hop may be divided into sub-hops of (4×)/(N) RBs—e.g., if N=4, then each hop may be evenly divided into x RBs.

According to some other aspects shown by the second partial SRS bandwidth frequency hopping pattern 822, each of the sub-hops of a symbol hop includes the same number of resources—e.g., each sub-hop of a symbol hop includes x RBs— but each of the hops do not have the same number of sub-hops—e.g., hops at symbols 10 and 11 have 4 sub-hops, whereas hops as symbols 12 and 13 have 2 sub-hops. For example, each symbol hop may include 4× RBs, where x may be equal to 4 or x may be greater than 4 (although other values are possible). The 4× RBs of hops at symbols 10 and 11 may be divided into sub-hops of (4×)/4 RBs or x RBs, whereas the 4× RBs of hops at symbols 12 and 13 may be divided into sub-hops of (4×)/2 RBs or 2× RBs.

According to still other aspects shown by the third partial SRS bandwidth frequency hopping pattern 842, each of the sub-hops of some symbol hops include different numbers of resources—e.g., hops at symbols 11 and 13 each include one sub-hop with 3× RBs and one sub-hop with x RBs—and, further, each of the hops do not have the same number of sub-hops—e.g., hops at symbols 10 and 12 have 4 sub-hops, whereas hops as symbols 11 and 13 have 2 sub-hops. For example, each symbol hop may include 4× RBs, where x may be equal to 4 or x may be greater than 4 (although other values are possible). The 4× RBs of hops at symbols 10 and 12 may be divided into sub-hops of (4×)/4 RBs or x RBs, whereas the 4× RBs of hops at symbols 11 and 13 may be divided into one sub-hop of 4× RBs and another sub-hop of x RBs.

When at least one of the UEs 604a-b is configured with a partial SRS bandwidth frequency hopping pattern that is limited to a subset of the set of RB s of at least one symbol hop for SRS transmission, the at least one of the UEs 604a-b may transmit SRS only on that subset of the set of RBs at that at least one symbol hop. Consequently, the at least one of the UEs 604a-b may refrain from transmitting SRS on other RBs of a symbol hop not included in the subset of RBs.

For example, the first UE 604a may be configured with an SRS resource set including first SRS 804a, and the second UE 604b may be configured with an SRS resource set includes second SRS 804b. Then, with one of the partial SRS bandwidth frequency hopping patterns 802, 822, 824, the first and second UEs 604a-b may then only transmit respective SRS 804a-b on those RBs respectively configured for one of SRS 804a-b per symbol hop.

Similarly, a third UE and a fourth UE may be configured to transmit third SRS 804c and fourth SRS 804d, respectively, according to a configured one of the partial SRS bandwidth frequency hopping patterns 802, 822, 842. Thus, multiple UEs (e.g., up to four UEs) may be multiplexed at each symbol hop to sound over a partial SRS bandwidth.

The base station 602 may assign sub-hops of symbol hops to UEs for such multiplexing. Further, the base station 602 may configure the division of resources into sub-hops for each hop, and may assign resources of each sub-hop to one of the UEs 604a-b. The base station 602 may transmit such a resource assignment in the SRS configuration information 622a-b, e.g., via RRC signaling, DCI, and/or MAC CE.

Figure 9:
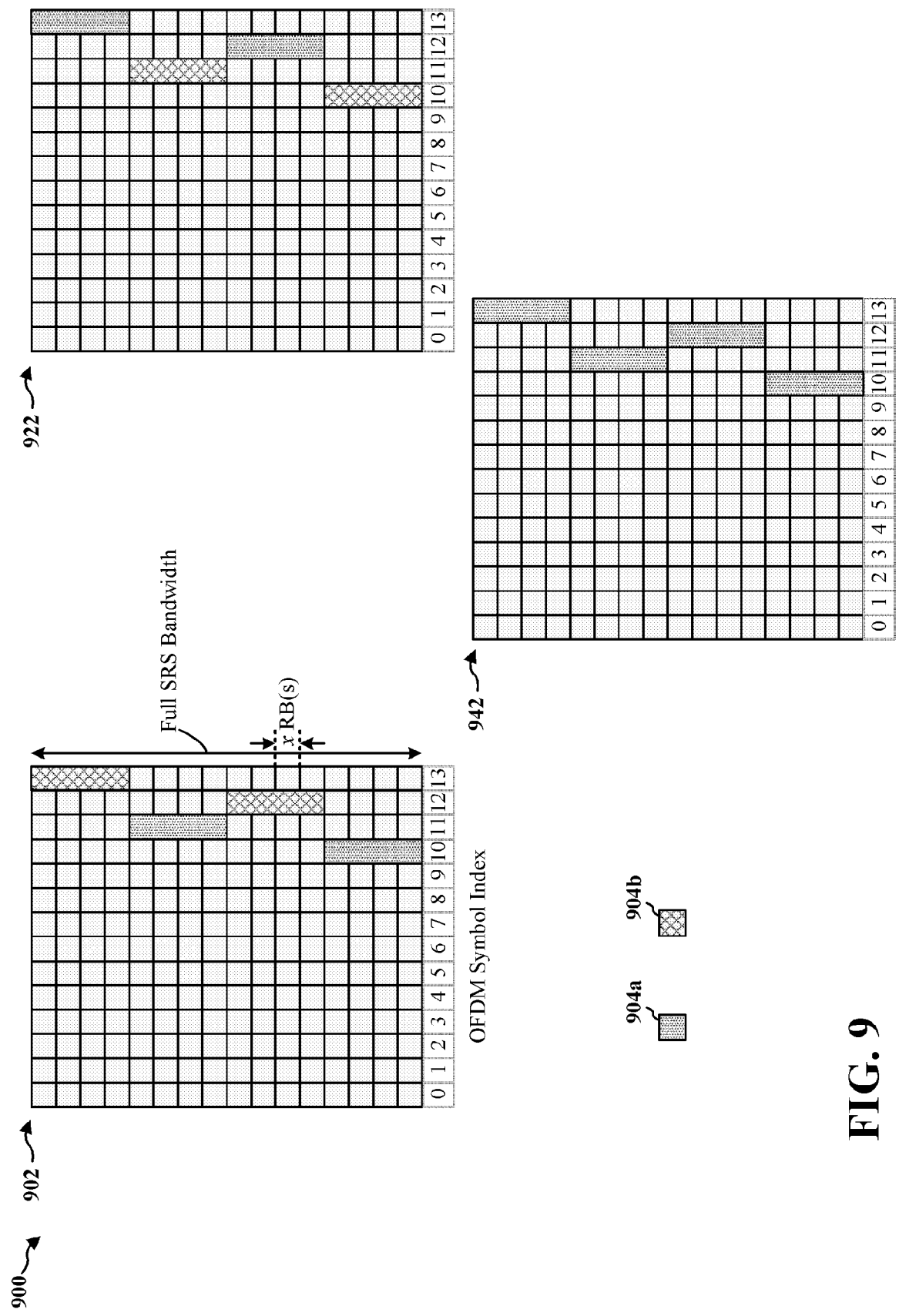
FIG. 9 is a diagram illustrating other example frequency hopping patterns for SRS transmission over a partial bandwidth of a full bandwidth configured for SRS.

Turning to FIG. 9, as another example, a diagram 900 illustrates example partial SRS bandwidth frequency hopping patterns 902, 922, 942. According to the partial SRS bandwidth frequency hopping patterns 902, 922, 942 of FIG. 9, the number of hops may be limited so that SRS transmission occurs only over a partial SRS bandwidth that is less than the full SRS bandwidth. When the number of symbol hops is limited, the UEs 604a-b may still use the configured number of SRS symbols and hops to determine 628, 630 the SRS frequency hopping pattern. However, the UEs 604*a-b* may refrain from transmitting on a subset of the set of symbol hops.

In some aspects, a partial SRS bandwidth frequency hopping pattern may include a limitation on a full SRS bandwidth frequency hopping pattern. The base station 602 may activate a respective limitation for each of the UEs 604*a-b* that restricts the symbol hops on which each of the UEs 604*a-b* may transmit SRS 904*a-b*. The base station 602 may transmit such a limitation in the SRS configuration information 622*a-b*, e.g., via RRC signaling, DCI, and/or MAC CE.

For example, the limitation may be configured for each of the UEs 604*a-b* according to a skipping pattern that indicates the symbol hops on which each of the UEs 604*a-b* is to transmit, and the other symbol hops on which each of the UEs 604*a-b* is to refrain from transmitting. For example, the base station 602 may transmit a respective bitmap to each of the UEs 604*a-b* that indicates a respective skipping pattern.

Illustratively, the base station 602 may transmit a first bitmap to the first UE 604*a* that indicates [1, 1, 0, 0], with a "1" indicating an assigned hop and a "0" indicating an unassigned hop. As shown in the first frequency hopping pattern 902, then, the first UE 604*a* may transmit SRS 904*a* on the set of RBs of the first and second hops at symbols 10 and 11, but may refrain from transmitting SRS on the third and fourth hops at symbols 12 and 13.

Similarly, the base station 602 may transmit a second bitmap to the second UE 604*b* that indicates [0, 0, 1, 1]. As shown in the first frequency hopping pattern 902, then, the second UE 604*b* may transmit SRS 904*b* on the set of RBs of the third and fourth hops at symbols 12 and 13, but may refrain from transmitting SRS on the first and second hops at symbols 10 and 11.

In some aspects, the limitation (e.g., skipping pattern) may be periodic or cycling. For example, the base station 602 may configure a frequency hopping pattern in which the first and second UEs 604*a-b* are multiplexed (e.g., as shown in patterns 902, 942), which may cycle with a frequency hopping pattern 922 in which only the first UE 604*a* transmits SRS 904*a* on all 4× RBs of all symbols hops (e.g., the second UE 604*b* refrains from SRS transmission).

Figure 10:
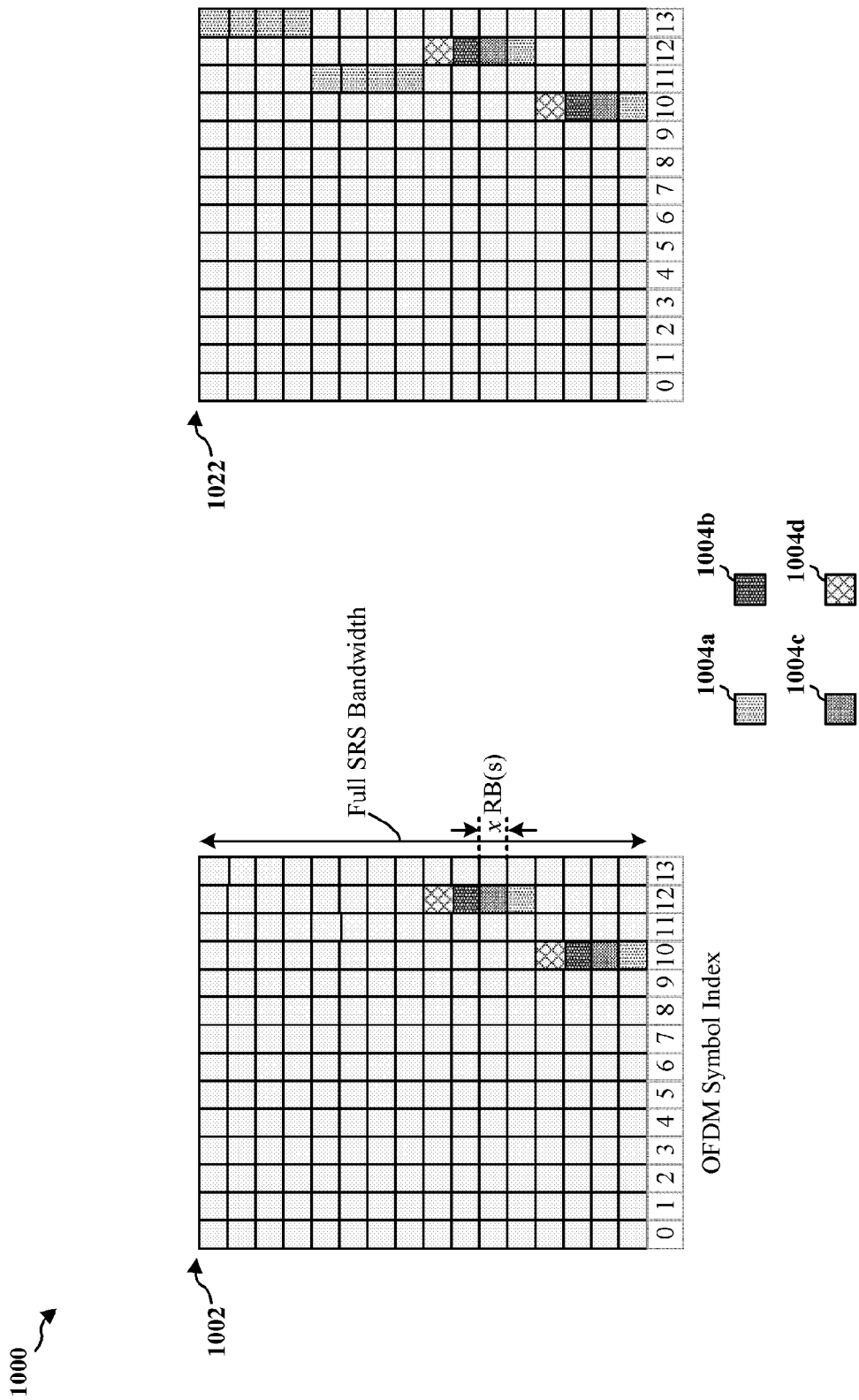
FIG. 10 is a diagram illustrating further example frequency hopping patterns for SRS transmission over a partial bandwidth of a full bandwidth configured for SRS.

Continuing with FIG. 10, as a third example, a diagram 1000 illustrates example partial SRS bandwidth frequency hopping patterns 1002, 1022. According to the partial SRS bandwidth frequency hopping patterns 1002, 1022 of FIG. 10, frequency hopping patterns in which the SRS transmission is limited to a subset of a set of RBs for at least one symbol hop (e.g., as shown at FIG. 8) may be combined with frequency hopping patterns in which the number of hops may be limited so that SRS transmission occurs only over a partial SRS bandwidth (e.g., as shown at FIG. 9).

For example, the base station 602 may configure a skipping pattern to limit a frequency hopping pattern to some symbol hops and, potentially, those symbol hops activated for SRS transmission may be constrained to a subset of the set of RBs of those symbol hops. The base station 602 may use the same signaling or may use different signaling to inform the UEs 604*a-b* of the skipping pattern and the subset of RBs (e.g., sub-hops). Thus, each of the SRS configuration information 622*a-b* may include one or more messages indicating a respective skipping pattern and a respective subset of RBs for symbol hops for one of the UEs 604*a-b*. The one or more messages may be transmitted by the base station 602 via RRC signaling, DCI, and/or MAC CE.

As shown in pattern 1002, the base station 602 may configure the first UE 604*a* to transmit SRS 1004*a* on the first x RBs of the 4× RBs of each symbol hop that is activated. Similarly, the base station 602 may configure the second UE 604*b* to transmit SRS 1004*b* on the second x RBs of the 4× RBs of each symbol hop that is activated. However, the base station 602 may deactivate (or skip) the hops at symbols 11 and 13, and therefore, neither the first UE 604*a* nor the second UE 604*b* may transmit on any RBs of the hops at symbols 11 and 13.

In the pattern 1004, however, the base station 602 may configure the first UE 604*a* to transmit SRS 1004*a* on the first x RBs of the 4× RBs of hops at symbols 10 and 12. Similarly, the base station 602 may configure the second UE 604*b* to transmit SRS 1004*b* on the second x RBs of the 4× RBs of hops at symbols 10 and 12. The base station 602 may deactivate (or skip) the hops at symbols 11 and 13 for the second UE 604*b*, so that the frequency hopping pattern determined 630 by the second UE 604*b* causes the second UE 604*b* to refrain from SRS transmission on hops at symbols 11 and 13. Conversely, the base station 602 may activate the full hops at symbols 11 and 13 for the first UE 604*a*, so that the frequency hopping pattern determined 628 by the first UE 604*a* causes the first UE 604*a* to transmit SRS 1004*a* on hops at symbols 11 and 13.

The foregoing patterns described at FIGS. 8-10 are intended to be illustrative. Accordingly, other frequency hopping patterns may be configured according to the present disclosure.

According to the respectively determined 628, 630 frequency hopping patterns, the UEs 604*a-b* may respectively transmit SRS 632, 634. The transmitted SRS 632, 634 may include the respectively generated 624, 626 sequences. However, neither the first SRS 632 nor the second SRS 634 may span the full SRS bandwidth (e.g., SRS hopping bandwidth), but may span only a subset of the RBs at each symbol hop and/or may be absent from one or more symbol hops of one or more slots.

Figure 11:
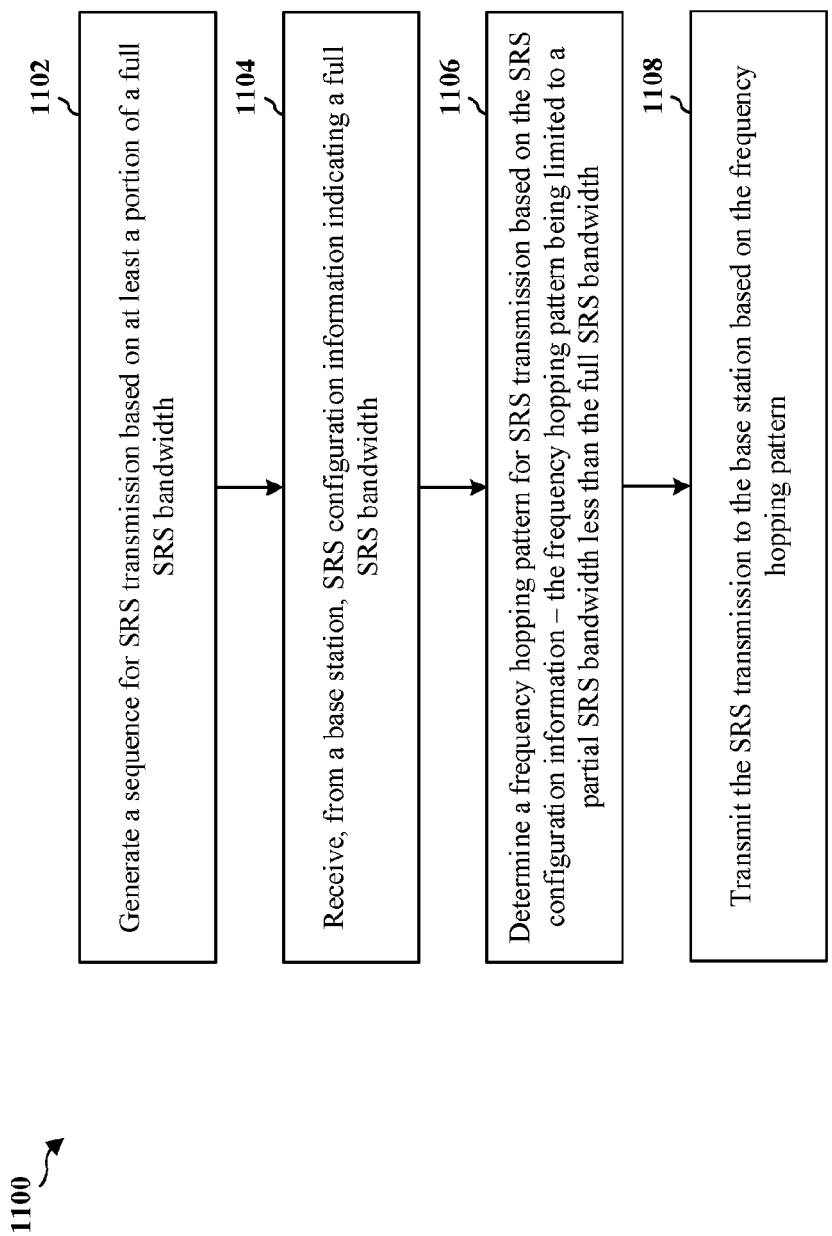
FIG. 11 is a flowchart of a method of wireless communication by a UE.

FIG. 11 is a flowchart 1100 of a method of wireless communication. The method may be performed by a UE (e.g., the UE 104, 350, 604*a*, 604*b*). According to various aspects, one or more of the illustrated operations may be transposed, omitted, and/or contemporaneously performed.

At 1102, the UE may generate a sequence for SRS transmission based on at least a portion of a full SRS bandwidth. In some aspects, the UE may generate a sequence based on a number of RBs of the full SRS bandwidth, and the UE may truncate the sequence for use in a partial SRS bandwidth. For example, the UE may assign a truncated portion of the sequence to each of a subset of a set of symbols based on a frequency hopping pattern such that SRS transmission includes each truncated portion of the sequence assigned to the subset of the set of symbols. In some other aspects, the UE may generate the sequence based on a number of RBs of a partial SRS bandwidth that is less than the full SRS bandwidth, and SRS transmission may include the sequence. For example, the UE may generate the sequence based on one or more cyclic shifts, and a number of the one or more cyclic shifts may be based on the partial SRS bandwidth. In further aspects, the UE may generate a sequence that is orthogonal to each overlapping sequence on the partial SRS bandwidth.

For example, referring to FIG. 6, the first UE 604*a* may generate 624 a sequence for the SRS 632 and/or the second UE 604*b* may generate 626 a sequence for the SRS 634.

At 1104, the UE may receive, from a base station, SRS configuration information indicating at least a full SRS bandwidth. For example, referring to FIG. 6, the first UE 604*a* may receive, from the base station 602, SRS configuration information 622a indicating at least a full SRS bandwidth and/or the second UE 604b may receive, from the base station 602, SRS configuration information 622b indicating at least a full SRS bandwidth.

At 1106, the UE may determine a frequency hopping pattern for SRS transmission based on the SRS configuration information, and the frequency hopping pattern may be limited to a partial SRS bandwidth less than the full SRS bandwidth. For example, the SRS configuration information may further indicate a set of RBs per symbol of a set of symbols available for the SRS transmission, and the frequency hopping pattern may be limited to at least one of a subset of the set of RBs per symbol or a subset of the set of symbols. In some aspects, the ratio of the subset of RBs to the set of RBs per symbol may be less than or equal to a threshold. In some other aspects, a respective subset of RBs per symbol is different for at least two of the set of symbols. In still other aspects, the SRS configuration information further indicates the subset of RBs assigned to the UE. In some further aspects, the SRS configuration indicates the subset of the set of symbols assigned to (or activated for) the UE. In even further aspects, the SRS configuration includes a bitmap having a first value corresponding to each of the subset of the set of symbols assigned to the UE, and having a second value corresponding to each remaining symbol of the set of symbols unassigned to the UE.

For example, referring to FIG. 6, the first UE 604a may determine 628 a frequency hopping pattern for SRS transmission based on the SRS configuration information 622a, and the frequency hopping pattern may be limited to a partial SRS bandwidth less than the full SRS bandwidth, and/or the second UE 604b may determine 630 a frequency hopping pattern for SRS transmission based on the SRS configuration information 622b, and the frequency hopping pattern may be limited to a partial SRS bandwidth less than the full SRS bandwidth. Referring to FIGS. 8-10, the first UE 604a and/or the second UE 604b may determine a frequency hopping pattern that is one of frequency hopping patterns 802, 822, 842 of FIG. 8, one of frequency hopping patterns 902, 922, 942 of FIG. 9, and/or one of frequency hopping patterns 1002, 1022 of FIG. 10.

At 1108, the UE may transmit the SRS transmission to the base station based on the frequency hopping pattern. The SRS transmission may include the generated sequence, which may be truncated or may be a new sequence based on the partial SRS bandwidth and/or orthogonal to other sequences overlapping on the partial SRS bandwidth.

For example, referring to FIG. 6, the first UE 604a may transmit the SRS 632 to the base station 602 based on the determined 628 frequency hopping pattern, and/or the second UE 604b may transmit the SRS 634 to the base station 602 based on the determined 630 frequency hopping pattern. Referring to FIGS. 8-10, the first UE 604a may transmit, to the base station 602, SRS 804a based on one of frequency hopping patterns 802, 822, 842 of FIG. 8, SRS 904a based on one of frequency hopping patterns 902, 922, 942 of FIG. 9, and/or SRS 1004a based on one of frequency hopping patterns 1002, 1022 of FIG. 10. Further to FIGS. 8-10, the second UE 604b may transmit, to the base station 602, SRS 804b based on one of frequency hopping patterns 802, 822, 842 of FIG. 8, SRS 904b based on one of frequency hopping patterns 902, 922, 942 of FIG. 9, and/or SRS 1004b based on one of frequency hopping patterns 1002, 1022 of FIG. 10.

Figure 12:
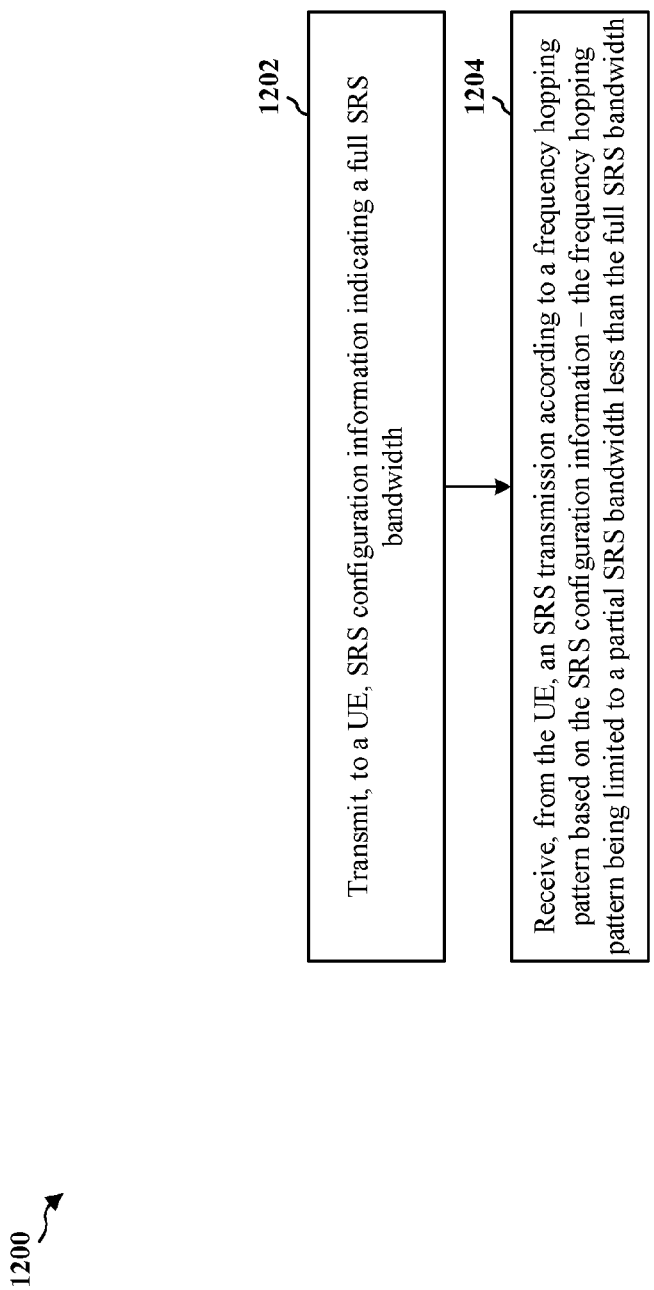
FIG. 12 is a flowchart of a method of wireless communication by a base station.

FIG. 12 is a flowchart 1200 of a method of wireless communication. The method may be performed by a base station (e.g., the base station 102/180, 310, 602). According to various aspects, one or more of the illustrated operations may be transposed, omitted, and/or contemporaneously performed.

At 1202, the base station may transmit, to a UE, SRS configuration information indicating at least a full SRS bandwidth. For example, referring to FIG. 6, the base station 602 may transmit, to the first UE 604a, SRS configuration information 622a indicating at least a full SRS bandwidth and/or may transmit, to the second UE 604b, SRS configuration information 622b indicating at least a full SRS bandwidth.

At 1204, the base station may receive, from the UE, an SRS transmission according to a frequency hopping pattern based on the SRS configuration information, and the frequency hopping pattern may be limited to a partial SRS bandwidth less than the full SRS bandwidth. For example, the SRS configuration information may further indicate a set of RBs per symbol of a set of symbols available for the SRS transmission, and the frequency hopping pattern may be limited to at least one of a subset of the set of RBs per symbol or a subset of the set of symbols. In some aspects, the ratio of the subset of RBs to the set of RBs per symbol may be less than or equal to a threshold. In some other aspects, a respective subset of RBs per symbol is different for at least two of the set of symbols. In still other aspects, the SRS configuration information further indicates the subset of RBs assigned to the UE. In some further aspects, the SRS configuration indicates the subset of the set of symbols assigned to (or activated for) the UE. In even further aspects, the SRS configuration includes a bitmap having a first value corresponding to each of the subset of the set of symbols assigned to the UE, and having a second value corresponding to each remaining symbol of the set of symbols unassigned to the UE. In some aspects, the SRS transmission may include a set of truncated portions of a sequence that is based on based on a number of RBs of the full SRS bandwidth. In some other aspects, the SRS transmission includes a sequence based on a number of RBs of the partial SRS bandwidth. In still other aspects, the sequence is based on one or more cyclic shifts, and a number of the one or more cyclic shifts may be based on the partial SRS bandwidth. In further aspects, the SRS transmission includes a sequence that is orthogonal to each overlapping sequence on the partial SRS bandwidth.

For example, referring to FIG. 6, the base station 602 may receive, from the first UE 604a, the SRS 632 according to a frequency hopping pattern based on the SRS configuration information 622a, and the frequency hopping pattern may be limited to a partial SRS bandwidth less than the full SRS bandwidth. Referring to FIGS. 8-10, the base station 602 may receive, from the first UE 604a, SRS 804a according to one of frequency hopping patterns 802, 822, 842 of FIG. 8 based on the SRS configuration information 622a, SRS 904a according to one of frequency hopping patterns 902, 922, 942 of FIG. 9 based on the SRS configuration information 622a, and/or SRS 1004a according to one of frequency hopping patterns 1002, 1022 of FIG. 10 based on the SRS configuration information 622a. Further, referring to FIG. 6, the base station 602 may receive, from the second UE 604b, the SRS 634 according to a frequency hopping pattern based on the SRS configuration information 622b, and the frequency hopping pattern may be limited to a partial SRS bandwidth less than the full SRS bandwidth. Referring to FIGS. 8-10, the base station 602 may receive, from the second UE 604b, SRS 804b according to one of frequency hopping patterns 802, 822, 842 of FIG. 8 based on the SRS configuration information 622b, SRS 904b according to one of frequency hopping patterns 902, 922, 942 of FIG. 9 based on the SRS configuration information 622b, and/or SRS 1004b according to one of frequency hopping patterns 1002, 1022 of FIG. 10 based on the SRS configuration information 622b.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving, from a base station, sounding reference signal (SRS) configuration information indicating a full SRS bandwidth and a set of resource blocks (RBs) per symbol of a set of symbols available for SRS transmission;
    determining a frequency hopping pattern for the SRS transmission based on the SRS configuration information, the frequency hopping pattern being limited to a partial SRS bandwidth less than the full SRS bandwidth and at least one of a subset of the set of RBs per symbol or a subset of the set of symbols; and
    transmitting the SRS transmission to the base station based on the frequency hopping pattern.

2. The method of claim 1, wherein a ratio of the subset of RBs to the set of RBs per symbol is less than or equal to a threshold.

3. The method of claim 1, wherein a respective subset of RBs per symbol is different for at least two of the set of symbols.

4. The method of claim 1, wherein the SRS configuration information further indicates the subset of RBs assigned to the UE.

5. The method of claim 1, wherein the SRS configuration information indicates the subset of the set of symbols assigned to the UE.

6. The method of claim 5, wherein the SRS configuration information comprises a bitmap having a first value corresponding to each of the subset of the set of symbols assigned to the UE and a second value corresponding to each remaining symbol of the set of symbols unassigned to the UE.

7. The method of claim 1, further comprising:
    generating a sequence based on a number of RBs of the full SRS bandwidth; and
    assigning a truncated portion of the sequence to each of the subset of the set of symbols, wherein the SRS transmission comprises each truncated portion of the sequence assigned to the subset of the set of symbols.

8. The method of claim 1, further comprising:
    generating a sequence based on a number of RBs of the partial SRS bandwidth,
    wherein the SRS transmission comprises the sequence.

9. The method of claim 8, wherein the sequence is generated based on one or more cyclic shifts, a number of the one or more cyclic shifts being based on the partial SRS bandwidth.

10. The method of claim 1, wherein the SRS transmission comprises a sequence that is orthogonal to each overlapping sequence on the partial SRS bandwidth.

11. A method of wireless communication by a base station, comprising:
    transmitting, to a user equipment (UE), sounding reference signal (SRS) configuration information indicating a full SRS bandwidth and a set of resource blocks (RBs) per symbol of a set of symbols available for an SRS transmission; and
    receiving, from the UE, an SRS transmission according to a frequency hopping pattern based on the SRS configuration information, the frequency hopping pattern being limited to a partial SRS bandwidth less than the full SRS bandwidth and at least one of a subset of the set of RBs per symbol or a subset of the set of symbols.

12. The method of claim 11, wherein a ratio of the subset of RBs to the set of RBs per symbol is less than or equal to a threshold.

13. The method of claim 11, wherein a respective subset of RBs per symbol is different for at least two of the set of symbols.

14. The method of claim 11, wherein the SRS configuration information further indicates the subset of RBs assigned to the UE.

15. The method of claim 11, wherein the SRS configuration information indicates the subset of the set of symbols assigned to the UE.

16. The method of claim 15, wherein the SRS configuration information comprises a bitmap having a first value corresponding to each of the subset of the set of symbols assigned to the UE and a second value corresponding to each remaining symbol of the set of symbols unassigned to the UE.

17. The method of claim 11, further comprising, wherein the SRS transmission comprises a set of truncated portions of a sequence that is based on based on a number of RBs of the full SRS bandwidth.

18. The method of claim 11, wherein the SRS transmission comprises a sequence based on a number of RBs of the partial SRS bandwidth.

19. The method of claim 18, wherein the sequence is based on one or more cyclic shifts, a number of the one or more cyclic shifts being based on the partial SRS bandwidth.

20. The method of claim 11, wherein the SRS transmission comprises a sequence that is orthogonal to each overlapping sequence on the partial SRS bandwidth.

21. An apparatus for wireless communication by a user equipment (UE), comprising:
a memory; and
at least one processor coupled to the memory and configured to:
receive, from a base station, sounding reference signal (SRS) configuration information indicating a full SRS bandwidth and a set of resource blocks (RBs) per symbol of a set of symbols available for SRS transmission;
determine a frequency hopping pattern for the SRS transmission based on the SRS configuration information, the frequency hopping pattern being limited to a partial SRS bandwidth less than the full SRS bandwidth and at least one of a subset of the set of RBs per symbol or a subset of the set of symbols; and
transmit the SRS transmission to the base station based on the frequency hopping pattern.

22. The apparatus of claim 21, wherein a ratio of the subset of RBs to the set of RBs per symbol is less than or equal to a threshold.

23. The apparatus of claim 21, wherein a respective subset of RBs per symbol is different for at least two of the set of symbols.

24. The apparatus of claim 21, wherein the SRS configuration information further indicates the subset of RBs assigned to the UE.

25. The apparatus of claim 21, wherein the SRS configuration information indicates the subset of the set of symbols assigned to the UE.

26. The apparatus of claim 25, wherein the SRS configuration information comprises a bitmap having a first value corresponding to each of the subset of the set of symbols assigned to the UE and a second value corresponding to each remaining symbol of the set of symbols unassigned to the UE.

27. The apparatus of claim 21, wherein the at least one processor is further configured to:
generate a sequence based on a number of RBs of the full SRS bandwidth; and
assign a truncated portion of the sequence to each of the subset of the set of symbols,
wherein the SRS transmission comprises each truncated portion of the sequence assigned to the subset of the set of symbols.

28. The apparatus of claim 21, wherein the at least one processor is further configured to:
generate a sequence based on a number of RBs of the partial SRS bandwidth,
wherein the SRS transmission comprises the sequence.

29. The apparatus of claim 28, wherein the sequence is generated based on one or more cyclic shifts, a number of the one or more cyclic shifts being based on the partial SRS bandwidth.

30. The apparatus of claim 21, wherein the SRS transmission comprises a sequence that is orthogonal to each overlapping sequence on the partial SRS bandwidth.

31. An apparatus of wireless communication by a base station, comprising:
a memory; and
at least one processor coupled to the memory and configured to:
transmit, to a user equipment (UE), sounding reference signal (SRS) configuration information indicating a full SRS bandwidth and a set of resource blocks (RBs) per symbol of a set of symbols available for SRS transmission; and
receive, from the UE, an SRS transmission according to a frequency hopping pattern based on the SRS configuration information, the frequency hopping pattern being limited to a partial SRS bandwidth less than the full SRS bandwidth and at least one of a subset of the set of RBs per symbol or a subset of the set of symbols.

32. The apparatus of claim 31, wherein a ratio of the subset of RBs to the set of RBs per symbol is less than or equal to a threshold.

33. The apparatus of claim 31, wherein a respective subset of RBs per symbol is different for at least two of the set of symbols.

34. The apparatus of claim 31, wherein the SRS configuration information further indicates the subset of RBs assigned to the UE.

35. The apparatus of claim 31, wherein the SRS configuration information indicates the subset of the set of symbols assigned to the UE.

36. The apparatus of claim 35, wherein the SRS configuration information comprises a bitmap having a first value corresponding to each of the subset of the set of symbols assigned to the UE and a second value corresponding to each remaining symbol of the set of symbols unassigned to the UE.

37. The apparatus of claim 31, wherein the at least one processor is further configured to, wherein the SRS transmission comprises a set of truncated portions of a sequence that is based on based on a number of RBs of the full SRS bandwidth.

38. The apparatus of claim 31, wherein the SRS transmission comprises a sequence based on a number of RBs of the partial SRS bandwidth.

39. The apparatus of claim 38, wherein the sequence is based on one or more cyclic shifts, a number of the one or more cyclic shifts being based on the partial SRS bandwidth.

40. The apparatus of claim 31, wherein the SRS transmission comprises a sequence that is orthogonal to each overlapping sequence on the partial SRS bandwidth.

41. An apparatus for wireless communication by a user equipment (UE), comprising:
means for receiving, from a base station, sounding reference signal (SRS) configuration information indicating a full SRS bandwidth and a set of resource blocks (RBs) per symbol of a set of symbols available for SRS transmission;

means for determining a frequency hopping pattern for the SRS transmission based on the SRS configuration information, the frequency hopping pattern being limited to a partial SRS bandwidth less than the full SRS bandwidth and at least one of a subset of the set of RBs per symbol or a subset of the set of symbols; and means for transmitting the SRS transmission to the base station based on the frequency hopping pattern.

42. The apparatus of claim 41, wherein a ratio of the subset of RBs to the set of RBs per symbol is less than or equal to a threshold.

43. The apparatus of claim 41, wherein a respective subset of RBs per symbol is different for at least two of the set of symbols.

44. The apparatus of claim 41, wherein the SRS configuration information further indicates the subset of RBs assigned to the UE.

45. The apparatus of claim 41, wherein the SRS configuration information indicates the subset of the set of symbols assigned to the UE.

46. The apparatus of claim 45, wherein the SRS configuration information comprises a bitmap having a first value corresponding to each of the subset of the set of symbols assigned to the UE and a second value corresponding to each remaining symbol of the set of symbols unassigned to the UE.

47. The apparatus of claim 41, further comprising:
means for generating a sequence based on a number of RBs of the full SRS bandwidth; and
means for assigning a truncated portion of the sequence to each of the subset of the set of symbols,
wherein the SRS transmission comprises each truncated portion of the sequence assigned to the subset of the set of symbols.

48. The apparatus of claim 41, further comprising:
means for generating a sequence based on a number of RBs of the partial SRS bandwidth, wherein the SRS transmission comprises the sequence.

49. The apparatus of claim 48, wherein the sequence is generated based on one or more cyclic shifts, a number of the one or more cyclic shifts being based on the partial SRS bandwidth.

50. The apparatus of claim 41, wherein the SRS transmission comprises a sequence that is orthogonal to each overlapping sequence on the partial SRS bandwidth.

51. An apparatus of wireless communication by a base station, comprising:
means for transmitting, to a user equipment (UE), sounding reference signal (SRS) configuration information indicating a full SRS bandwidth and a set of resource blocks (RBs) per symbol of a set of symbols available for SRS transmission; and
means for receiving, from the UE, an SRS transmission according to a frequency hopping pattern based on the SRS configuration information, the frequency hopping pattern being limited to a partial SRS bandwidth less than the full SRS bandwidth and at least one of a subset of the set of RBs per symbol or a subset of the set of symbols.

52. The apparatus of claim 51, wherein a ratio of the subset of RBs to the set of RBs per symbol is less than or equal to a threshold.

53. The apparatus of claim 51, wherein a respective subset of RBs per symbol is different for at least two of the set of symbols.

54. The apparatus of claim 51, wherein the SRS configuration information further indicates the subset of RBs assigned to the UE.

55. The apparatus of claim 51, wherein the SRS configuration information indicates the subset of the set of symbols assigned to the UE.

56. The apparatus of claim 55, wherein the SRS configuration information comprises a bitmap having a first value corresponding to each of the subset of the set of symbols assigned to the UE and a second value corresponding to each remaining symbol of the set of symbols unassigned to the UE.

57. The apparatus of claim 51, further comprising, wherein the SRS transmission comprises a set of truncated portions of a sequence that is based on based on a number of RBs of the full SRS bandwidth.

58. The apparatus of claim 51, wherein the SRS transmission comprises a sequence based on a number of RBs of the partial SRS bandwidth.

59. The apparatus of claim 58, wherein the sequence is based on one or more cyclic shifts, a number of the one or more cyclic shifts being based on the partial SRS bandwidth.

60. The apparatus of claim 51, wherein the SRS transmission comprises a sequence that is orthogonal to each overlapping sequence on the partial SRS bandwidth.

61. A non-transitory computer-readable storage medium storing computer-executable code for wireless communication by a user equipment (UE), the code when executed by a processor cause the processor to:
receive, from a base station, sounding reference signal (SRS) configuration information indicating a full SRS bandwidth and a set of resource blocks (RBs) per symbol of a set of symbols available for SRS transmission;
determine a frequency hopping pattern for the SRS transmission based on the SRS configuration information, the frequency hopping pattern being limited to a partial SRS bandwidth less than the full SRS bandwidth and at least one of a subset of the set of RBs per symbol or a subset of the set of symbols; and
transmit the SRS transmission to the base station based on the frequency hopping pattern.

62. A non-transitory computer-readable storage medium storing computer-executable code for wireless communication by a base station, the code when executed by a processor cause the processor to:
transmit, to a user equipment (UE), sounding reference signal (SRS) configuration information indicating a full SRS bandwidth and a set of resource blocks (RBs) per symbol of a set of symbols available for SRS transmission; and
receive, from the UE, an SRS transmission according to a frequency hopping pattern based on the SRS configuration information, the frequency hopping pattern being limited to a partial SRS bandwidth less than the full SRS bandwidth and at least one of a subset of the set of RBs per symbol or a subset of the set of symbols.

* * * * *